United States Patent [19]
Komori

[11] Patent Number: 5,809,208
[45] Date of Patent: Sep. 15, 1998

[54] DIGITAL IMAGE RECORDING AND REPRODUCING AND METHOD FOR RECORDING AND REPRODUCING AN AMOUNT OF IMAGE DATA ON A RECORDING MEDIUM CONFIGURED FOR A LESSER AMOUNT OF IMAGE DATA USING PARTITIONING INFORMATION

[75] Inventor: Noboru Komori, Asaka, Japan

[73] Assignee: Fuji Photo Film Co., Ltd., Kanagawa, Japan

[21] Appl. No.: 595,212

[22] Filed: Feb. 1, 1996

[30] Foreign Application Priority Data

Feb. 1, 1995 [JP] Japan .................................. 7-034705
Dec. 27, 1995 [JP] Japan .................................. 7-351169

[51] Int. Cl.$^6$ ...................................................... H04N 5/92
[52] U.S. Cl. ........................... 386/120; 386/124; 386/123
[58] Field of Search ................................ 386/35, 36, 38, 386/40, 37, 45, 92, 95, 107, 108, 109, 111–112, 117–119, 123, 126, 120; 360/27; 358/906, 909.1; H04N 5/92, 5/76, 9/74, 5/225

[56] References Cited

U.S. PATENT DOCUMENTS

| | | | |
|---|---|---|---|
| 4,730,222 | 3/1988 | Schauffele ................................. | 386/37 |
| 4,910,605 | 3/1990 | Sasaki et al. .............................. | 386/36 |
| 4,963,991 | 10/1990 | Honjo ....................................... | 386/37 |
| 4,982,291 | 1/1991 | Kurahashi et al. . | |
| 5,047,865 | 9/1991 | Inoue ........................................ | 386/36 |
| 5,138,459 | 8/1992 | Roberts et al. . | |
| 5,159,460 | 10/1992 | Senso ........................................ | 386/37 |
| 5,159,461 | 10/1992 | Fujimoto .................................. | 386/38 |
| 5,270,831 | 12/1993 | Parulski et al. . | |
| 5,307,171 | 4/1994 | Azuma et al. ........................... | 386/123 |
| 5,394,275 | 2/1995 | Iketani et al. ............................ | 386/35 |
| 5,412,514 | 5/1995 | Kobayashi . | |
| 5,414,465 | 5/1995 | Kodama et al. . | |
| 5,436,665 | 7/1995 | Ueno et al. . | |
| 5,495,343 | 2/1996 | Ogura ....................................... | 386/123 |
| 5,510,840 | 4/1996 | Yonemitsu et al. . | |
| 5,513,010 | 4/1996 | Kori et al. . | |
| 5,543,925 | 8/1996 | Timmermans . | |

FOREIGN PATENT DOCUMENTS 469861 2/1992 European Pat. Off. .

OTHER PUBLICATIONS

Nikkei Electronics Books, "Data Compression and Digital Modulation", pp. 137–152, Nikkei BP Sha, 1993.

*Primary Examiner*—Thai Tran

[57] ABSTRACT

In a case where a frame image possessing an amount of data greater than a predetermined amount is recorded on a magnetic tape using a multiplicity of tracks, on which tracks the data has been recorded is made clear. Image data composed of 1,400,000 pixels, which is four times that of the conventional number of 350,000 pixels, is obtained. Since the image data has an amount of data that is four times that in a frame image when photography is performed using the conventional 350,000-pixel CCD, the image data is recorded in a video recording area one frame at a time on ten tracks per frame, for a total of forty tracks. Auxiliary-area recording data representing on which tracks the recorded image data has been recorded and the manner in which the recorded image has been partitioned is recorded in an auxiliary recording area. When an image is reproduced, one frame of a still picture is produced after reference is made to the auxiliary-area recording data that has been recorded in the auxiliary recording area. An image can be reproduced promptly even though an image having a large amount of data is recorded on the recording tape upon being partitioned.

16 Claims, 17 Drawing Sheets

| | | | | | |
|---|---|---|---|---|---|
| G | | G | | G | |
| | R, B | | R, B | | R, B |
| G | | G | | G | |
| | R, B | | R, B | | R, B |
| G | | G | | G | |
| | R, B | | R, B | | R, B |

Fig. 9a

| | MSB | | | | | | | LSB | |
|---|---|---|---|---|---|---|---|---|---|
| PC0 | 1 | 1 | 1 | 1 | 0 | 0 | 0 | 0 | → HEADER |
| PC1 | 0 | 0 | 0 | 1 | 1 | 0 | 1 | 1 | → MAKER CODE |
| PC2 | 0 | 0 | 0 | 0 | 0 | 0 | 1 | 0 | → TOTAL NUMBER OF OPTION PACKS |
| PC3 | 0 | 0 | 0 | 0 | 0 | 1 | 0 | 0 | → RECORDING-TYPE MODE SETTING |
| PC4 | 1 | 1 | 1 | 1 | 1 | 1 | 1 | 1 | → NO INFORMATION |

Fig. 9b

| | MSB | | | | | | | LSB | |
|---|---|---|---|---|---|---|---|---|---|
| PC0 | 1 | 1 | 1 | 1 | 0 | 0 | 0 | 1 | → HEADER |
| PC1 | 0 | 0 | 0 | 0 | 0 | 1 | 0 | 0 | → PARTITIONING METHOD |
| PC2 | 0 | 0 | 0 | 0 | 0 | 1 | 1 | 0 | → NUMBER OF THIS FRAME |
| PC3 | 0 | 0 | 0 | 0 | 0 | 0 | 0 | 0 | → DATA DISPLAY METHOD OR INSERTION METHOD ON DISPLAY UNIT |
| PC4 | 1 | 1 | 1 | 1 | 1 | 1 | 1 | 1 | → NO INFORMATION |

DIGITAL IMAGE RECORDING AND REPRODUCING AND METHOD FOR RECORDING AND REPRODUCING AN AMOUNT OF IMAGE DATA ON A RECORDING MEDIUM CONFIGURED FOR A LESSER AMOUNT OF IMAGE DATA USING PARTITIONING INFORMATION

BACKGROUND OF THE INVENTION

1. Field of the Invention

This invention relates to a digital image data recording apparatus inclusive of a digital video tape recorder (DVTR) and digital camera, etc., a method of recording digital image data in a DVTR, as well as an apparatus and method for reproducing digital image data that has been recorded on a magnetic tape by the DVTR or recording method.

2. Description of the Related Art

A digital video tape recorder (DVTR) senses the image of a subject using a solid-state electronic image sensing device such as a CCD, converts a video signal, which represents the image of the subject obtained by image sensing, to digital image data and records the digital image data on magnetic tape. A CCD used in a digital video tape recorder generally has about 350,000 pixels in an array of 720 pixels horizontally and 480 pixels vertically. In a digital video tape recorder, it is possible to perform frame recording, in which one frame is composed of two fields and frame images are recorded, and field recording, in which a field image is recorded for each field. In the case of frame recording, photography is carried out continuously at a predetermined shutter speed and at a period of $1/30$ of a second. In the case of field recording, photography is carried out continuously at a predetermined shutter speed and at a period of $1/60$ of a second. In both frame recording and field recording, one frame of image data is recorded on magnetic tape over a time of $1/30$ of a second and using a recording area composed of ten tracks.

Thus, in a digital video tape recorder, one frame of image data of the digital image data obtained by photographing a subject using a 350,000-pixel CCD generally is recorded on ten tracks over a period of $1/30$ of a second. This recording scheme is the standard in industry. (For example, see NIKKEI ELECTRONICS BOOKS, "Data Compression and Digital Modulation", pp. 137–152, *Nikkei BP Sha*, 1993).

The image quality of the image recorded on magnetic tape by the digital video tape recorder depends upon the number of pixels in the CCD; the larger the number of CCD pixels, the greater the improvement in image quality. However, if image data obtained from a CCD is recorded on magnetic tape using a CCD having a large number of pixels for the sake of improving image quality, recording one frame of image data requires more than $1/30$ of a second and a recording area of more than ten tracks. This is not in conformity with the above-mentioned standard established for a digital video tape recorder.

In order to record image data, the amount of which is greater than that in one frame of image data obtained by photography using a 350,000-pixel CCD, on magnetic tape, it will suffice to use more tracks than are used to record one frame of image data.

However, when image data is recorded using more tracks than the number of tracks, which is decided by the digital video tape recorder standards, used in the recording of one frame of image data, a situation can arise in which it is no longer possible to tell which tracks have recorded one frame of image data. As a consequence, image reproduction can be performed neither promptly nor accurately.

SUMMARY OF THE INVENTION

Accordingly, an object of the present invention is to make possible the prompt and accurate reproduction of images even in a case where image data the amount of which is greater than that in unit image data conforming to digital video tape recorder standards has been recorded using more tracks than the tracks used to record the unit image data.

According to a first aspect of the present invention, the foregoing object is attained by providing a digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively at a period equivalent to the recording time, the apparatus comprising an input portion for entering image data possessing an amount of data that is n times the amount of data in the unit image data, an image data partitioning portion for partitioning the image data, which has been obtained from the input portion, into n units of unit image data in such a manner that each represents one frame of an image, an image-data information generating portion for generating information relating to the image data partitioned by the image data partitioning portion, a recording portion for recording the n units of unit image data, which have been partitioned by the image data partitioning portion, on the recording medium over n recording areas at a recording time increased by a factor of n, and an image-data information recording portion for recording, in an auxiliary recording area other than the recording area of the unit image data, the information relating to the image data generated by the image-data information generating portion.

According to the first aspect of the invention, there is also provided a method of recording digital image data. Specifically, in a digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively at a period equivalent to the recording time, the recording method comprises the steps of obtaining image data possessing an amount of data that is n times the amount of data in the unit image data, partitioning the obtained image data into n units of unit image data so as to represent one frame of an image, generating information relating to the n units of image data obtained by partitioning, recording the n units of unit image data obtained by partitioning on the recording medium over n recording areas at a recording time increased by a factor of n, and recording the information relating to the generated n units of unit image data on the recording medium in an auxiliary recording area other than the recording area of the unit image data.

In a preferred embodiment, a movie recording mode and a still-picture recording mode are provided, and the above-described recording method is executed when the still-picture recording mode has been set. As will be described later, reproduction of a moving picture also is possible based upon image data that has been recorded in the still-picture recording mode.

The unit image data corresponds to one frame of image data if stated in terms of the present industrial standard mentioned above.

It is permissible to enter image data output by an image data processing apparatus other than a television and obtain image data having an amount of data that is n times the amount of image data in the unit image data. It is permissible to provide the digital image data recording apparatus with image sensing means and sense the image of the subject using the image sensing means, thereby obtaining image data representing the image of the subject and having an amount of data that is n times the amount of image data in the unit image data.

It is permissible to sense the image of a subject using a single solid-state electronic image sensing device which generates an amount of data that is n times the amount of image data in the unit image data with regard to one frame of an image, and obtain image data representing the image of the subject. It is also permissible to sense the image of a subject using three solid-state electronic image sensing devices and obtain image data representing the image of the subject and having an amount of data that is n times the amount of image data in the unit image data.

In any case, image data representing the image of the subject and having an amount of data that is n times the amount of image data in the unit image data is obtained. As a result, an image having a high image quality is captured at the image sensing stage.

In order to record image data, which is capable of producing the high-quality image thus obtained, while maintaining compatibility with a recording scheme in accordance with existing standards and without losing any image data, the present invention is so adapted that the image data representing the image of the subject is partitioned into n units of unit image data. The n units of unit image data obtained by partitioning is recorded on the recording medium in accordance with the recording scheme of the existing standards.

Thus, the image quality of the high-quality image data obtained by image sensing is maintained as is and recording is performed in a form that conforms to the existing standards.

In the first aspect of the invention, information relating to the partitioned n units of unit image data, e.g., the method of partitioning the image data, recording-area data representing a unit image data recording area in which the partitioned image data is recorded, data representing a particular number of a portion into which the image data has been partitioned, or data representing a method of displaying or inserting image data on a display unit, is generated and recorded in the auxiliary recording area of the recording medium.

By obtaining the information relating to the partitioned image data at the time that the image data is reproduced, which image data in the partitioned image data should be used to reproduce an accurate image can be determined, by way of example. Accordingly, even though the image data has an amount of data greater than the amount of data in the unit image data, a high-quality still picture can be reproduced accurately and promptly.

The partitioning of the image data into n portions is carried out in such a manner that the image represented by the partitioned image data also is capable of expressing one frame of an image. Since one frame of an image is represented even by one unit of unit image data obtained by partitioning, the method of the invention is suited to moving-picture reproduction performed for every unit of unit image data.

An apparatus and method for reproducing digital image data according to the present invention reproduce image data from a recording medium that has been recorded on in the manner described above. The reproducing apparatus and method can be applied to the above-mentioned digital image data recording apparatus or can be implemented as an independent digital image data reproducing apparatus.

If the digital image data reproducing apparatus is defined from the standpoint of reproduction of a still picture, the apparatus is characterized by provision of a reading portion for reading image data and information relating to the image data from the recording medium, and a still-picture generating portion for generating image data, which represents one frame of a still picture, by combining n units of unit image data, based upon the information relating to image data read by the reading means, read by the reading portion and generated by partitioning from one frame of image data.

The method of reproducing digital image data is characterized by steps of reading image data and information relating to the image data from the recording medium, and generating image data, which represents one frame of a still picture, by combining n units of read unit image data generated by partitioning from one frame of image data, based upon the read information relating to image data.

If the digital image data reproducing apparatus is defined from the standpoint of reproduction of a still picture and a moving picture, the apparatus is characterized by provision of a reading portion for reading image data and information relating to the image data from the recording medium, a playback mode setting portion for selectively setting a still-picture playback mode and a movie playback mode, a still-picture generating portion which, when the still-picture playback mode has been set, is for generating image data, which represents one frame of a still picture, by combining n units of unit image data, based upon the information relating to image data read by the reading portion, read by the reading portion and generated by partitioning from one frame of image data, and a moving-picture generating portion which, when the movie playback mode has been set, is for converting unit image data, which has been read by the reading portion, to a signal suitable for display and outputting the signal successively at a period equivalent to the recording time.

A method of reproducing digital image data is characterized by steps of reading image data and information relating to the image data from the recording medium, making it possible to selectively set a still-picture playback mode and a movie playback mode, generating, when the still-picture playback mode has been set, image data representing one frame of a still picture by combining n units of read unit image data, generated by partitioning from one frame of image data, based upon the read information relating to image data, and, when the movie playback mode has been set, converting the read unit image data to a signal suitable for display and outputting the signal successively at a period equivalent to the recording time.

Image data is read from the area in which the unit image data is recorded on the recording medium, and information relating to the image data is read from the auxiliary area of the recording medium, this area differing from the area in which the unit image data is recorded. On the basis of the information relating to the image data, n units of unit image data generated by partitioning of one frame of image data and recorded in the recording operation are combined so as to represent one frame of the original still picture. The combined still picture data is displayed upon being applied to a display unit or the still picture is printed out upon being applied to a printer. In general, it should be so arranged that a high-quality printed image is obtained only when the still picture data is applied to the printer.

Since the still picture is synthesized based upon the information relating to the partitioned n units of unit image data, rapid and accurate synthesis of the still picture is possible.

Since image data composed of a large number of pixels is restored as is, a high-quality still picture is obtained.

Reproduction of a moving picture is possible based upon the image data read out of the recording medium. Reproduction of the moving picture obtained by an ordinary digital video tape recorder can be dealt with in the same manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9a and 9b illustrate auxiliary-area data;

DESCRIPTION OF THE PREFERRED EMBODIMENTS

Before discussing the construction and operation of a digital video tape recorder, the existing industrial standard relating to a system for recording on magnetic tape by a digital video tape recorder will be described.

Figure 17A:
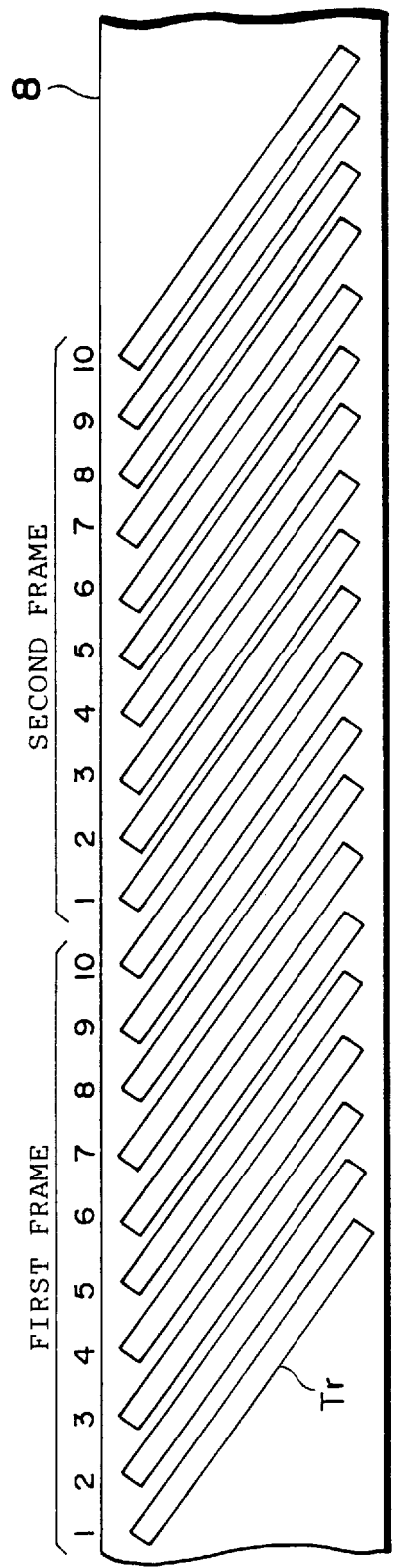
FIG. 17a illustrates the format of a magnetic tape and FIG. 17b shows a track format.
Figure 17B:
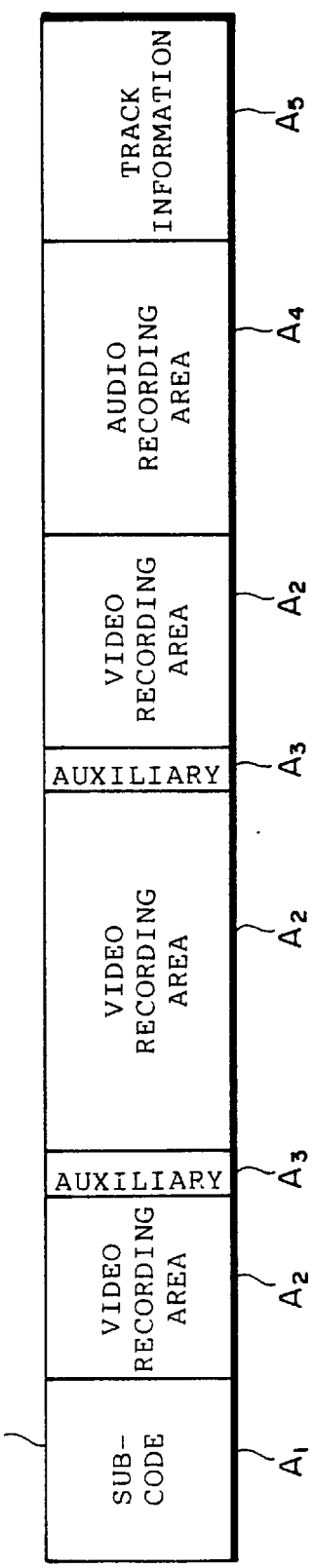

The recording format of a magnetic tape is as illustrated in FIGS. 17a and 17b. FIG. 17a illustrates tracks Tr on a magnetic tape 8. A large number of the tracks Tr are formed diagonally at a fixed angle with respect to the longitudinal direction of the magnetic tape 8. One frame of digital image data is recorded using ten consecutive tracks among the multiplicity of tracks Tr.

FIG. 17b illustrates the track format. One track Tr includes a sub-code recording area, a video recording area, an auxiliary recording area, an audio recording area and a track information recording area. Information such as time codes for high-speed retrieval and absolute track numbers is recorded in the sub-code recording area. Digital image data representing the image of a subject is recorded in the video recording area. Data representing sound is recorded in the audio recording area. Information serving as a reference for the tracks for the purpose of causing the magnetic head to trace the center of the tracks Tr is recorded in the track information recording area. The auxiliary recording area is provided randomly and is used to record additional information. In this embodiment of the invention the details of which will be described later, information relating to image data that has been recorded in the video recording area is recorded in the auxiliary recording area. Gaps provided between the areas are deleted from the drawing.

The CCD used in a digital video tape recorder generally is one having about 350,000 pixels in an array of 720 horizontal pixels and 480 vertical pixels according to the prior art. One frame of digital image data obtained using such a CCD is recorded on ten tracks of the magnetic tape 8. This is the existing standard.

A CCD having a large number of pixels should be used to improve the image quality of the image represented by the image data recorded on the magnetic tape 8. In a digital video tape recorder, however, the standard is so decided that digital image data representing an image of 720 pixels horizontally and 480 pixels vertically is recorded on ten tracks. Consequently, when digital image data representing an image having more than 350,000 pixels is recorded on the magnetic tape 8, the result no longer conforms to the standard. The digital video tape recorder according to the present invention makes it possible to obtain image data representing an image having more than 350,000 pixels and to record image data conforming to the existing recording standard of digital video tape recorders.

Figure 1:
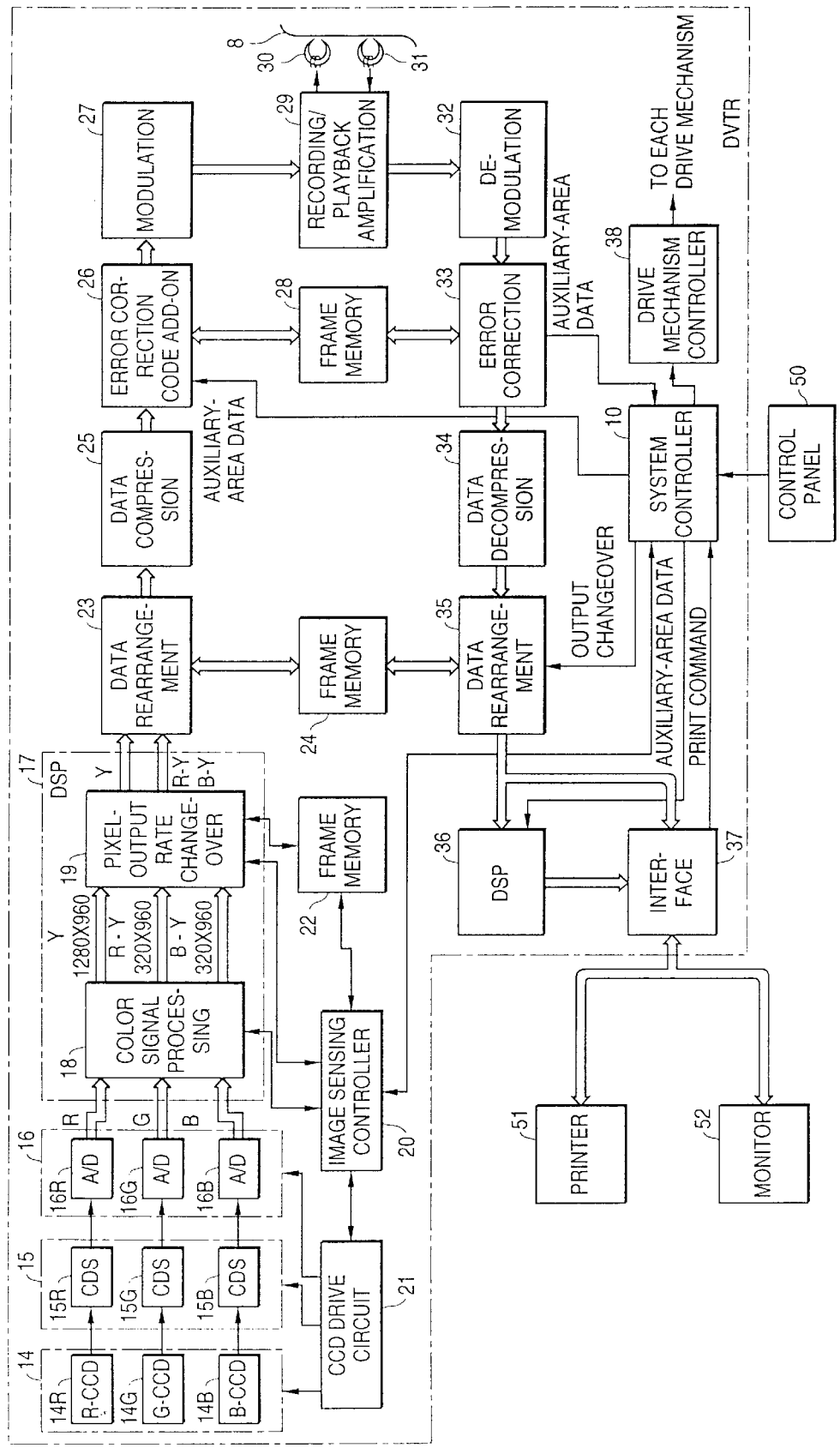
FIG. 1 is a block diagram illustrating the electrical configuration of a digital video tape recorder.

FIG. 1 is a block diagram illustrating an embodiment of the present invention and showing the electrical configuration of a digital video tape recorder (DVTR) capable of recording and playing back digital image data. The overall operation of the digital video tape recorder is supervised by a system controller 10.

The digital video tape recorder is capable not only of photographing a subject but also of reproducing image data that has been recorded on the magnetic tape 8. In addition, photography of a subject capable of being carried out includes movie photography and still photography. The digital video tape recorder is provided with a control panel 50 in order to set these modes.

Figure 2:
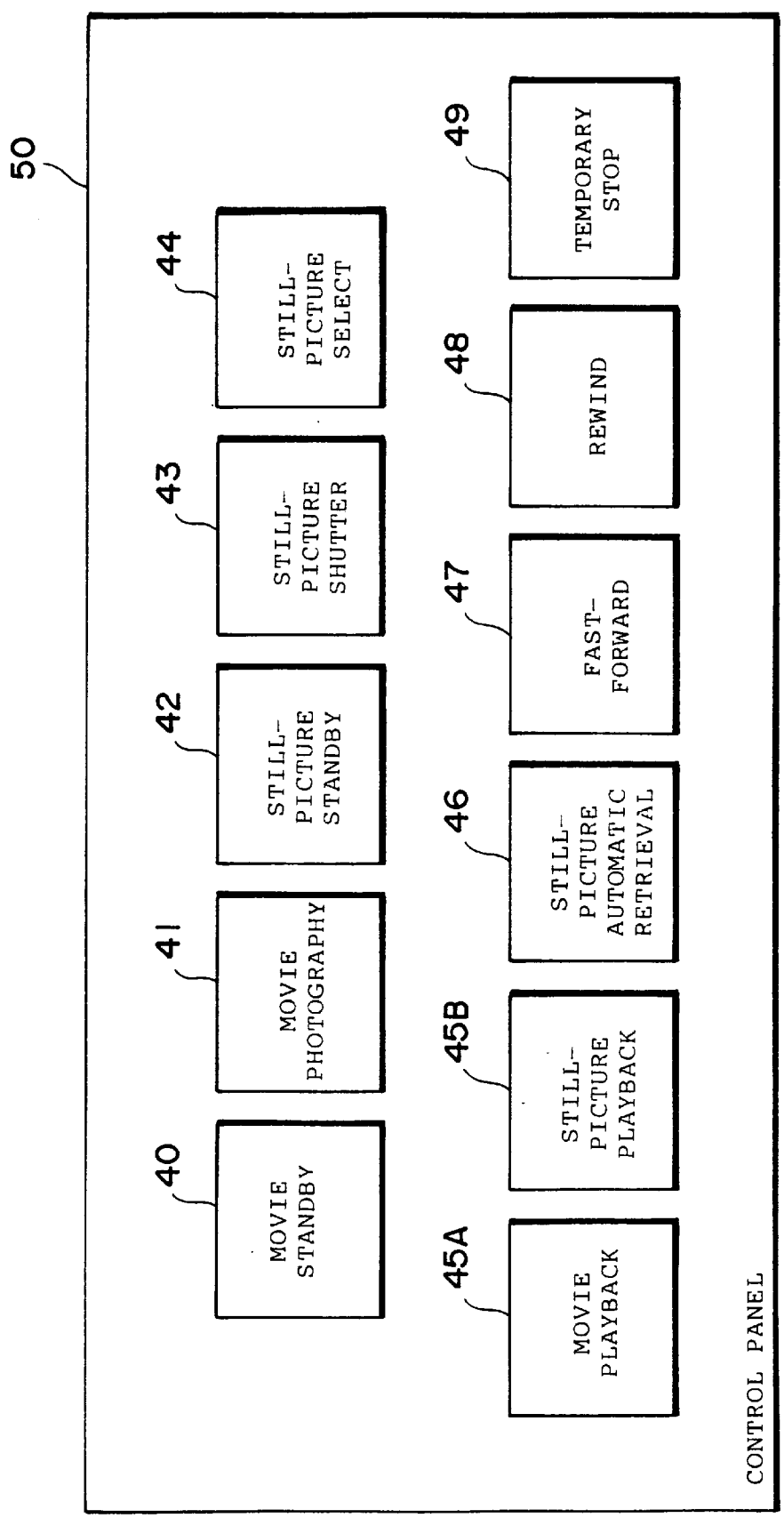
FIG. 2 illustrates a control panel.

As shown in FIG. 2, the control panel 50 includes a movie standby button 40 used to prepare for movie photography, a movie photography switch 41 for setting the beginning and end of movie photography, a still-picture standby button 42 used to prepare for still photography, a shutter release button 43 for still photography, and a still-picture select switch 44 for selecting a still photography mode from either high-quality still photography or ordinary-quality still photography. The shutter release button 43 for still photography is of the two-stroke type. The control panel 50 further includes a movie playback switch 45A for setting the beginning and end of movie playback, a still-picture playback button 45B for setting high-quality still-picture synthesizing processing, a still-picture automatic retrieval button 46 for setting a still-picture retrieval mode in which an image obtained by still photography is retrieved and displayed, a fast-forward button 47 for fast-forwarding the magnetic tape 8, a rewind button 48 for rewinding the magnetic tape 8, and a temporary-stop button 49 for temporarily stopping the magnetic tape 8. The setting signals from these various buttons and switches on the control panel 50 are applied to the system controller 10.

In the example shown in FIG. 2, the various buttons and switches are disposed on the single control panel 50. In actuality, however, the buttons and switches would be dispersed over the case of the camera upon taking camera operability into account.

Figure 3:
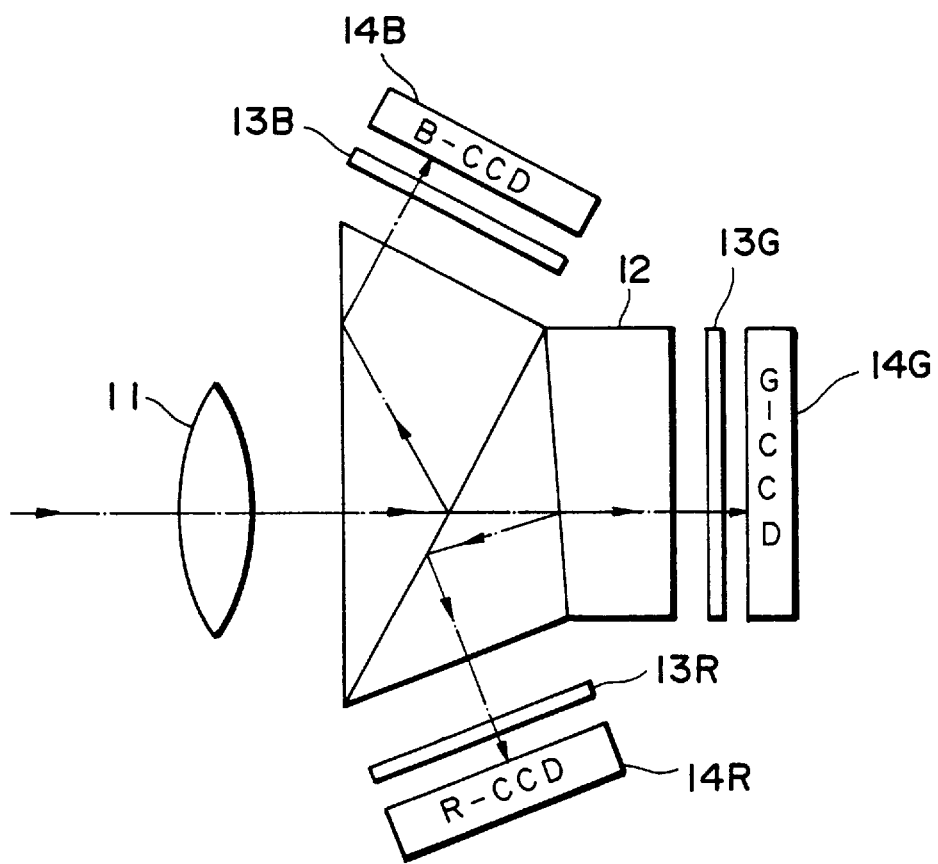
FIG. 3 illustrates the relationship between an image sensing optical system and CCDS.

FIG. 3 illustrates an image sensing optical system which includes CCDs (charge-coupled devices).

The image sensing optical system of the digital video tape recorder includes three CCDs, namely CCDs 14R, 14G and 14B. The CCDs 14R, 14G and 14B each have 640 pixels in the horizontal direction and 480 pixels in the vertical direction. The CCDs 14R, 14G and 14B output video signals of the colors red, green and blue, respectively, and have a red filter 13R, a green filter 13G and a blue filter 13B, respectively, placed in front of them.

A pencil of light rays is condensed by an image sensing lens 11 and introduced to a prism 12. The condensed pencil of light rays is divided into three pencils of light rays by the prism 12 and these impinge upon the CCDs 14R, 14G and 14B. The prism 12 is so designed that the optical distances of the three divided pencils of light rays will be equal to one another.

As shown in FIG. 1, the image sensing section of the digital video tape recorder is controlled by an image sensing controller 20, which controls a CCD drive circuit 21. An image sensing circuit 14 which includes the CCDs 14R, 14G and 14B is controlled by the CCD drive circuit 21, whereby the storage of signal charge in the CCDs 14R, 14G and 14B and the sweep-out of this signal charge is controlled. In the case of movie photography, all the signal charge accumulated in the CCDs 14R, 14G and 14B is output as a video signal at a period of $1/60$ of a second (in the strict sense, $1.001/60$ of a second) (all pixels readout).

The video signals of the colors red, green and blue output by the CCDs 14R, 14G and 14B, respectively, are applied to CDS (correlated double sampling) circuits 15R, 15G and 15B, respectively, contained in a signal-charge detection circuit 15, whereby kTC noise components are eliminated. The red, green and blue video signals are converted to red, green and blue digital image data in analog/digital (A/D) converter circuits 16R, 16G and 16B, respectively, contained in A/D converter unit 16.

The red, green and blue digital image data are applied to a color signal processing circuit 18 contained in a DSP (digital signal processor) 17. Using the entered digital image data of the colors red, green and blue, the color signal processing circuit 18 generates luminance data composed of 1280 pixels in the horizontal direction and 960 pixels in the vertical direction, as well as R-Y and B-Y color-difference data composed of 320 pixels in the horizontal direction and 960 pixels in the vertical direction. The generation of the luminance data and R-Y, B-Y color-difference data is performed as set forth below.

Figures 4, 5:
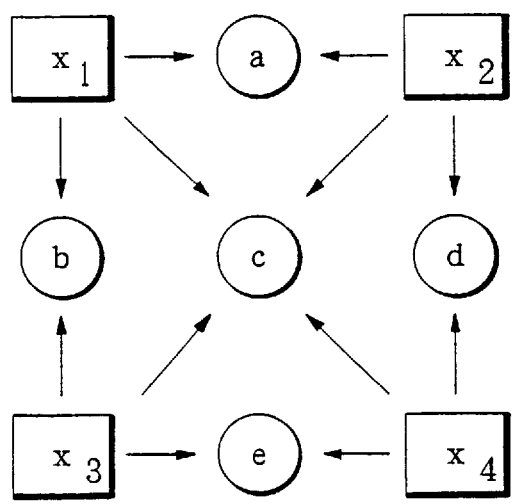
FIG. 4 is a diagram in which the pixels represented by image data of the colors red, green and blue obtained by three CCDs are shown in the same plane.
FIG. 5 illustrates a method of generating interpolated pixels.

FIG. 4 shows the manner in which the images represented by the digital image data of the colors red, green and blue are expressed in the same plane. Pixels represented by the image data of the colors red, green and blue are disposed at intervals every other pixel in both the horizontal and vertical directions. The pixels of the color green are disposed in columns and rows that differ from the columns and rows in which the pixels of the colors red and blue appear. The pixels between these sporadically distributed pixels have no image data and are blank areas. Image data for the pixels in these blank areas is generated.

FIG. 5 illustrates the manner in which pixels are generated. In FIG. 5, the characters a, b, c, d and e are pixels that are devoid of image data. The characters $x_1, x_2, x_3$ and $x_4$ are pixels in which image data is present. The image data of the pixels denoted by the characters a, b, c, d, and e is generated in the following manner:

$$a=(x_1+x_2)/2$$
$$b=(x_1+x_3)/2$$
$$c=(x_1+x_2+x_3+x_4)/4$$
$$d=(x_2+x_4)/2$$
$$e=(x_3+x_4)/2$$

By virtue of these operations, red, green and blue image data composed of 640 pixels horizontally and 480 pixels vertically is used to obtain red, green and blue image data composed of 1280 pixels horizontally and 960 pixels vertically, which is twice the number of number of pixels in both the horizontal and vertical directions. From red, green and blue image data composed of 1280 pixels horizontally and 960 pixels vertically, luminance data as well as R-Y and B-Y color-difference data composed of 1280 pixels horizontally and 960 pixels vertically is generated. The R-Y and B-Y color-difference data is subjected to sampling processing in such a manner that the number of pixels in the horizontal direction is reduced to one-fourth. As a result, the R-Y and B-Y color-difference data becomes color-difference data composed of 320 pixels horizontally and 960 pixels vertically. The luminance data and the R-Y, B-Y color-difference data outputted by the color signal processing circuit 18 is applied to a pixel output-rate changeover circuit 19.

The pixel output-rate changeover circuit 19 is a circuit which changes the method of outputting image data and the amount of image data in dependence upon the mode set in the control panel 50.

Figure 6:
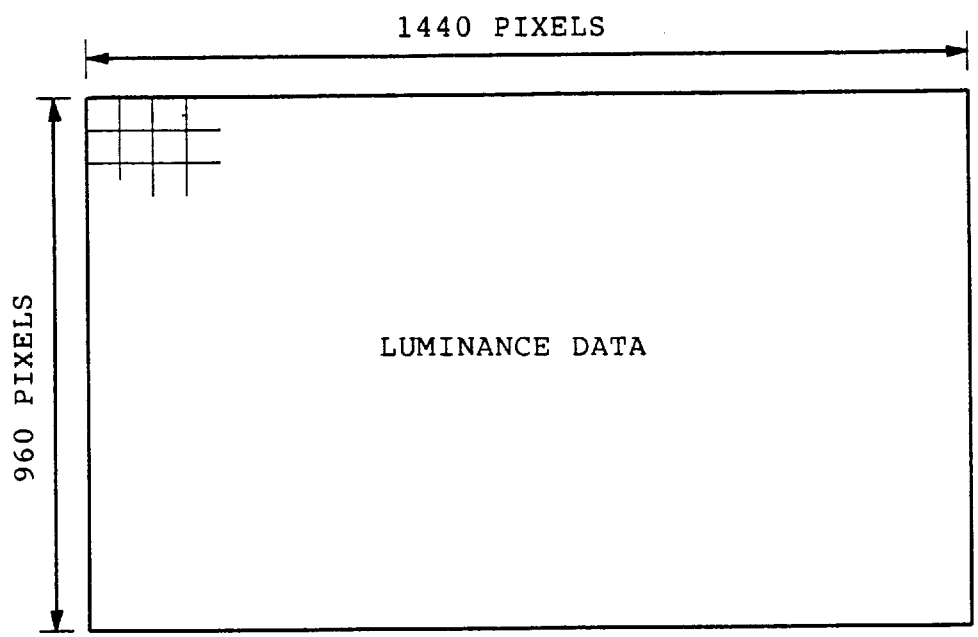
FIG. 6 illustrates an image represented by luminance data obtained by a high-quality still-picture photography mode.

When the high-quality still-picture recording mode has been set by the control panel 50, image-data interpolation processing is executed and luminance data composed of 1440 pixels horizontally and 960 pixels vertically, in the manner illustrated in FIG. 6, from luminance data composed of 1280 pixels horizontally and 960 pixels vertically. As a result, luminance data composed of approximately 1,400,000 pixels is obtained. This is an amount of data that is four times that (about 350,000 pixels) of one frame of data in the prior art. This luminance data of about 1,400,000 pixels is divided into four frames and output from the pixel output-rate changeover circuit 19. The method of dividing up this luminance data is as set forth below.

Figure 8:
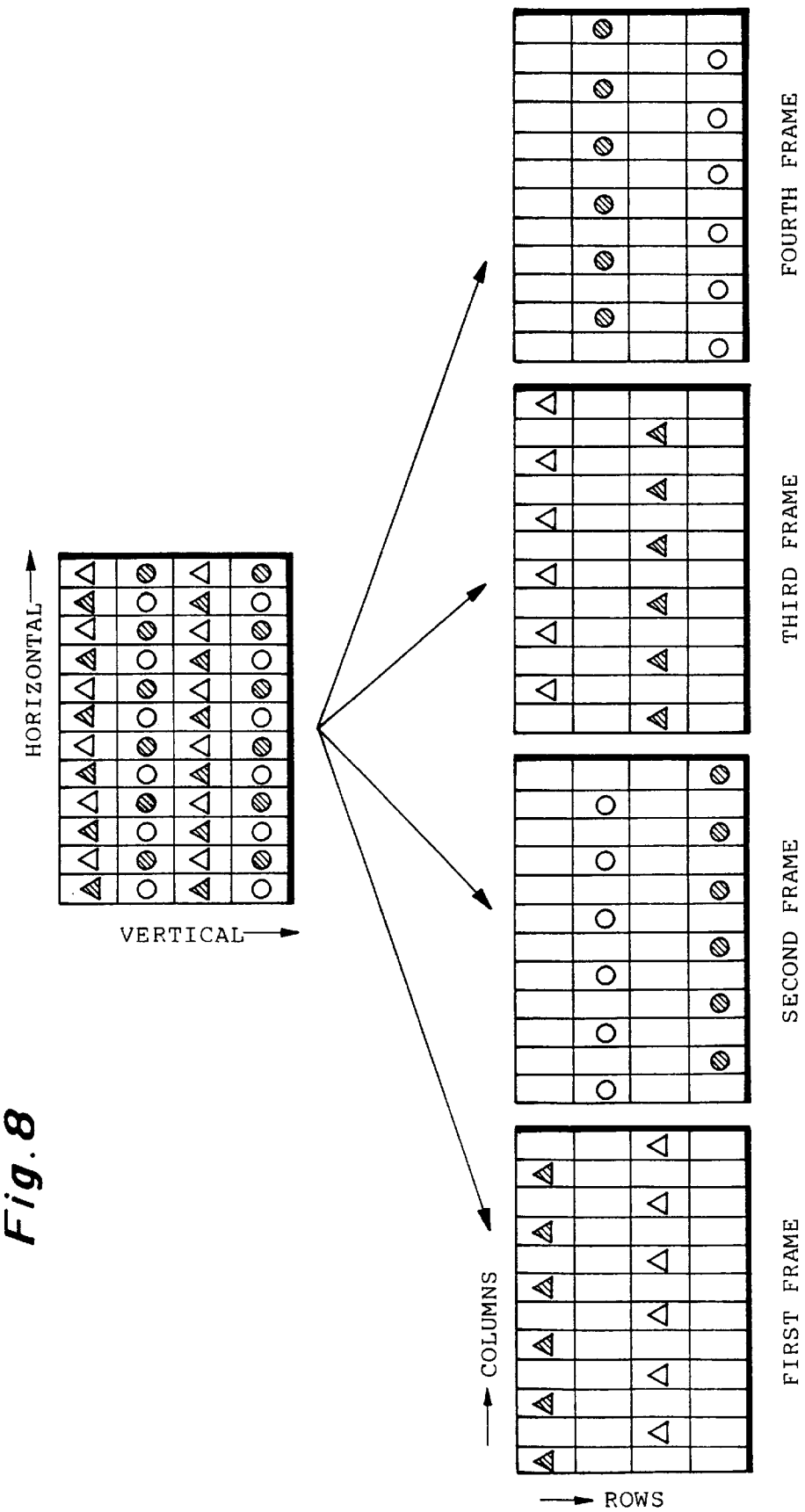
FIG. 8 illustrates a method of partitioning an image.

FIG. 8 schematically illustrates the manner in which the luminance data composed of the pixels shown in FIG. 6 is partitioned into four frames. In order to simplify the drawing, the numbers of pixels are drawn to be much fewer than in actuality in both the horizontal and vertical directions. As shown in the upper half of FIG. 8, one frame of luminance data includes image data regarding all horizontal and vertical pixels (1440 pixels horizontally and 960 pixels vertically) shown in FIG. 6. The luminance data corresponding to all pixels shown in FIG. 6 is stored in a frame memory 22.

Readout of luminance data from the frame memory 22 is performed over four frames from the first to the fourth frames (see the lower half of FIG. 8).

The luminance data of the first frame read out first and the luminance data of the third frame read out third is luminance data in which the pixels are in odd-numbered rows. The luminance data in the odd rows is expressed by black triangle marks and white triangle marks. The black triangles indicate luminance data in odd columns, and the white triangles indicate luminance data in even-numbered columns. The luminance data of the first frame is composed of luminance data in odd- and even columns repeated alternately in the vertical direction. The luminance data of the third frame is composed of luminance data in odd- and even columns repeated alternately in the vertical direction and is data that is not contained in the first frame.

The luminance data of the second frame read out second and the luminance data of the fourth frame read out fourth is luminance data in which the pixels are in even rows. The luminance data in the even rows is expressed by black circle marks and white circle marks. The white circles indicate luminance data in oddnumbered columns, and the black circles indicate luminance data in even-numbered columns. The luminance data of the second frame is composed of luminance data in odd- and even columns repeated alternately in the vertical direction. The luminance data of the fourth frame is composed of luminance data in odd- and even columns repeated alternately in the vertical direction and is data that is not contained in the second frame.

Thus, the luminance data of all pixels is read out only one time in any frame. Moreover, the pixels of the luminance data constructing each frame are dispersed in the vertical and horizontal directions and the image of the subject can be expressed in its entirety by luminance data in any frame whatsoever.

Readout of the image data over these four frames can readily be expressed by controlling the addressing of the frame memory 22. For example, in the readout of the first frame, an odd row is designated as the vertical address. As for the horizontal address, it will suffice to generate an address signal which designates an odd column when the row is an (4m+1)th row and an address signal which designates an even column when the row is the (4m+3)th row (where m=0, 1, 2, . . . ). Readout of one frame of image data should be performed in 1/30 of a second. This generation of address signals can be executed by the system controller 10 or implemented by a counter, frequency divider, logic circuit, etc.

Figure 7:
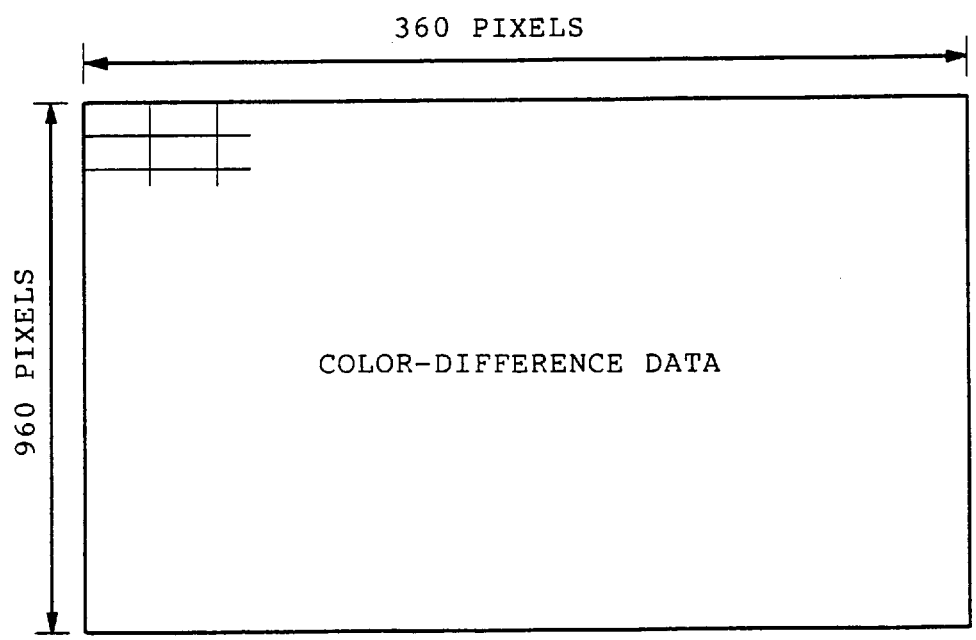
FIG. 7 illustrates an image represented by color-difference data obtained by a high-quality still-picture photography mode.

With regard to the R-Y and B-Y color-difference data, pixel interpolation processing is performed in the pixel output-rate changeover circuit 19, color-difference data composed of 360 pixels horizontally and 960 pixels vertically is generated from 320 pixels in the horizontal direction and 960 pixels in the vertical direction, as shown in FIG. 7, and the color-difference data is applied to the frame memory 22, where this data is then stored. The color-difference data stored in the frame memory 22 also is partitioned into four frames in the same manner as the luminance data, and the color-difference data is read out of the frame memory 22.

It goes without saying that the frame memory 22 is capable of storing four frames of luminance data, R-Y color-difference data and B-Y color-difference data.

The luminance data partitioned into four frames and outputted from the pixel output-rate changeover circuit 19 is applied to data rearrangement circuit 23. Further, the R-Y and B-Y color-difference data is output from the pixel output-rate changeover circuit 19 alternately in predetermined amounts of data, and this outputted color-difference data is applied to the data rearrangement circuit 23.

When the ordinary still-picture recording mode has been set on the control panel 50, pixel eliminating processing is performed in the pixel output-rate changeover circuit 19 so that luminance data composed of 720 pixels horizontally and 480 pixels vertically is generated from input luminance data composed of 1280 pixels horizontally and 960 pixels vertically and color-difference data composed of 180 pixels horizontally and 480 pixels vertically is generated from input color-difference data composed of 320 pixels horizontally and 960 pixels vertically. The generated luminance data, R-Y and B-Y color-difference data is applied to the data rearrangement circuit 23.

When the movie recording mode has been set by the control panel 50, first luminance data composed of 720 pixels horizontally and 480 pixels vertically as well as R-Y and B-Y color-difference data composed of 180 pixels horizontally and 480 pixels vertically is generated in the same manner as in the ordinary still-picture recording mode. Two items of image data (luminance data and color-difference data) which are shifted by 1/60 of a second are regarded as being a first field of image data and as being second field of image data, respectively. That is, of the first image data, the image data of odd rows is treated as being the first field of image data, and of the next image data which is obtained 1/60 of a second later, the image data of even rows is treated as being the second field of image data. The first field of image data and the second field of image data are alternately outputted from the image output-rate changeover circuit 19 and applied to the data rearrangement circuit 23.

The image data output by the pixel output-rate changeover circuit 19 is applied to a frame memory 24 through the data rearrangement circuit 23. The data is stored in the frame memory 24 temporarily. The image data that has been stored in the frame memory 24 is applied to the data rearrangement circuit 23. Here processing for dividing the image data into a number of blocks of 8×8 pixels each and processing for rearranging the image data conforming to the standard of the digital video tape recorder is executed.

The image data output by the data rearrangement circuit 23 is applied to a data compression circuit 25 successively starting from the image data of the first frame. The data compression circuit 25 subjects the image data to data compression by applying DCT (discrete cosine transform) processing, quantization processing, etc. The image data compressed in the data compression circuit 25 is applied to a frame memory 28 via an error correction code add-on circuit 26 (i.e., the data is merely passed through the circuit 26). The frame memory 28 stores the compressed data temporarily.

The image data that has been stored in the frame memory 28 is successively applied to the error correction code add-on circuit 26, where an error correction code is added on. The image data to which the error correction code has been added is applied to the frame memory 28 again. Here the data is stored. The image data is read out of the frame memory 28 again and applied to the error correction code add-on circuit 26. The latter is also provided with auxiliary-area data from the system controller 10.

The auxiliary-area data is information relating to digital image data obtained by photography of a subject, and data representing other information. An example of auxiliary-area recording data is shown in FIGS. 9a and 9b. As shown in FIGS. 9a and 9b, the auxiliary-area recording data is eight-bit data, and five types of data are recorded in one auxiliary recording area.

The auxiliary-area data includes a source control pack, a source pack, and maker option data. The maker option data includes a header, a maker code, total number option packs, mode setting of the recording scheme, partitioning method, information representing the number of the present frame, information indicating a method of displaying or inserting data on a display unit, and recording-area data representing a video recording area in which partitioned image data is stored. The source control pack is data which, by way of example, indicates whether or not copying of the digital image data recorded on the magnetic tape 8 is prohibited. The source pack is data which, in a case where both frame-image movie recording and field-image movie recording are possible, indicates in which of these modes recording has been performed.

The header is the data at the beginning of the five types of data recorded in one auxiliary recording area and indicates the type of the remaining four types of data. The maker code is a code indicating the particular maker of the digital video tape recorder that recorded the digital image data. The total number of option packs indicates the number of items of auxiliary-area data capable of being recorded in an auxiliary recording area. The mode setting of the recording scheme represents the image-data output mode setting set in the DSP circuit 17 when digital image data is recorded. The partitioning method indicates the manner in which partitioning is performed in a case where image data is partitioned in the manner shown in FIG. 8 when the digital image data is recorded. The information indicating the number of the present frame represents the particular number of an item of image data in a case where image data constructing one frame has been partitioned into a plurality of portions. The method of displaying or inserting data on a display unit indicates the manner in which one frame is generated and displayed on the display unit at the time of playback in a case where the image data is partitioned at recording time.

These items of auxiliary-area data are generated by the system controller 10 and added onto the image data (auxiliary area). The track format is determined in advance, as shown in FIG. 17b, and so are the positions of auxiliary recording areas $A_3$. Accordingly, auxiliary-area recording data can be distinguished from other data based upon the recording positions of the areas $A_3$.

With regard to the image data representing the image of the first frame, the auxiliary-area data representing the particular number of this frame is expressed by "00000010", for example, as shown in FIG. 9b. With regard to the image data representing the image of the second frame, the auxiliary-area data representing the particular number of this frame is expressed by "00000001", for example.

The image data output by the error correction code add-on circuit 26 is applied to a modulator circuit 27, where the image data is coded (by NRZI coding, for example) before being applied to a recording/playback amplifier circuit 29. The image data that has been amplified in the recording/playback amplifier circuit 29 is applied to a magnetic head 30. As a result, image data is recorded by the magnetic head 30 in a video recording area $A_2$ of each track on the magnetic tape 8, and auxiliary area data is recorded by the magnetic head 30 in the auxiliary recording area A3 of each track. Recording of audio data and track information also is performed as a matter of course.

The image data therefore is recorded in video recording area $A_2$ on ten consecutive tracks thereof. The next frame of image data in the four frames of image data is recorded in the video recording area $A_2$ on ten tracks that follow the image data of the initial frame of image data already recorded. The next frame of image data in the four frames of image data is recorded in the video recording area $A_2$ on the next ten tracks thereof, and the final frame of image data in the four frames of image data is recorded in the video recording area $A_2$ on the next ten tracks thereof. Since one frame of image data having an amount of image data of about 1,400,000 possesses four times the amount of data contained in one frame of image data obtained using the 350,000-pixel CCD employed normally, this data is recorded on the magnetic tape 8 using 40 tracks. The operation for recording the four frames is performed at a period of $1/7.5$ of a second in the same manner that four frames of photography is carried out.

The image data having the amount of image data of about 350,000 pixels obtained in the ordinary still-picture recording mode and the image data having the amount of image data of about 350,000 pixels obtained in the movie recording mode is recorded in the video recording area $A_2$ on ten consecutive tracks thereof.

When the image data has been recorded on the magnetic tape 8 by the high-quality or ordinary still-picture recording mode, a still-picture identification code is recorded in the sub-code area.

The digital video tape recorder shown in FIG. 1 is also capable of reproducing digital image data that has been recorded on the magnetic tape 8. The playback mode includes a movie playback mode and a still-picture automatic retrieval mode.

In the mode for playing back digital image data, the image data, auxiliary-area data and other data recorded on the magnetic tape 8 is read out by the magnetic head 31 and applied to the recording/playback amplifier circuit 29. The data amplified by the recording/playback amplifier circuit 29 is applied to a demodulator circuit 32. Data demodulation is performed by the modulator circuit 32 and the demodulated data is applied to and temporarily stored in the frame memory 28 via an error correction circuit 33. The data that has been recorded in the frame memory 28 is read out and applied to the error correction circuit 33. If the data demodulated by the demodulator circuit 32 contains a data error, then error correction processing is executed in the error correction circuit 33. The digital image data representing the image of the subject in the data that has been subjected to error correction processing is applied to a data decompression circuit 34, and the auxiliary-area data contained in the data that has been subjected to error correction processing is applied to the system controller 10. The playback operation also is performed at a period of $1/7.5$ of a second with regard to four frames of image data.

In the movie playback mode, compressed image data is subjected to data decompression processing in the data decompression circuit 34. The digital image data that has been decompressed in the data decompression circuit 34 is applied to a data rearrangement circuit 35. Here the array of image data conforming to the standard of the digital video tape recorder is restored to the array of the display image in a monitor display unit 52.

In the movie playback mode, the data rearrangement circuit 35 is controlled by the system controller 10 in such a manner that the image data output by the data rearrangement circuit 35 is applied to an interface 37.

The digital image data output by the data rearrangement circuit 35 is applied to the monitor display unit 52 one field at a time via the interface 37 and a moving picture is played back. The monitor display unit 52 may be provided in the digital video tape recorder.

The digital video tape recorder illustrated in FIG. 1 is also capable of high-quality still-picture playback in addition to movie playback. In the high-quality still-picture playback mode, the image data output by the data rearrangement circuit 35 is applied to a DSP circuit 36. The auxiliary-area data from the system controller 10 also is applied to the DSP circuit 36. Which image data to use to generate one complete frame of an image can be determined from the data representing the particular number of the present frame, and how to combine the partitioned image data to generate one complete frame of an image can be determined from the data representing the partitioning method, these items of data being contained in the auxiliary-area data provided by the system controller 10. On the basis of the data representing the particular number of the present frame and the data representing the partitioning method, one complete frame of an image is generated in the DSP circuit 36. As a result, one frame of a high-quality image shown in the upper half of FIG. 8 is obtained from the four images shown in the lower half of FIG. 8.

The one frame of image data generated in the DSP circuit 36 is applied to a printer 51 via the interface 37, whereby a high-quality still picture is printed out.

It is stated above that image data having four times as much image data as that obtained from an ordinary CCD is acquired, partitioned into four frames and recorded on magnetic tape. However, the amount of image data is not limited to four times that obtained from an ordinary CCD. An arrangement may be adopted wherein image data having an amount of data in which the number of pixels is any whole-number multiple n (n=2, 3, 4, 5, . . . ) of the number of pixels in the image data from the ordinary CCD is obtained to acquire one frame of image data. In such case the image data obtained would be partitioned into n-number of frames and recorded on the magnetic tape in conformity with the amount of image data.

Though each of the circuits mentioned above is constituted by hardware, some of the hardware circuitry can be implemented by software.

Figure 10:
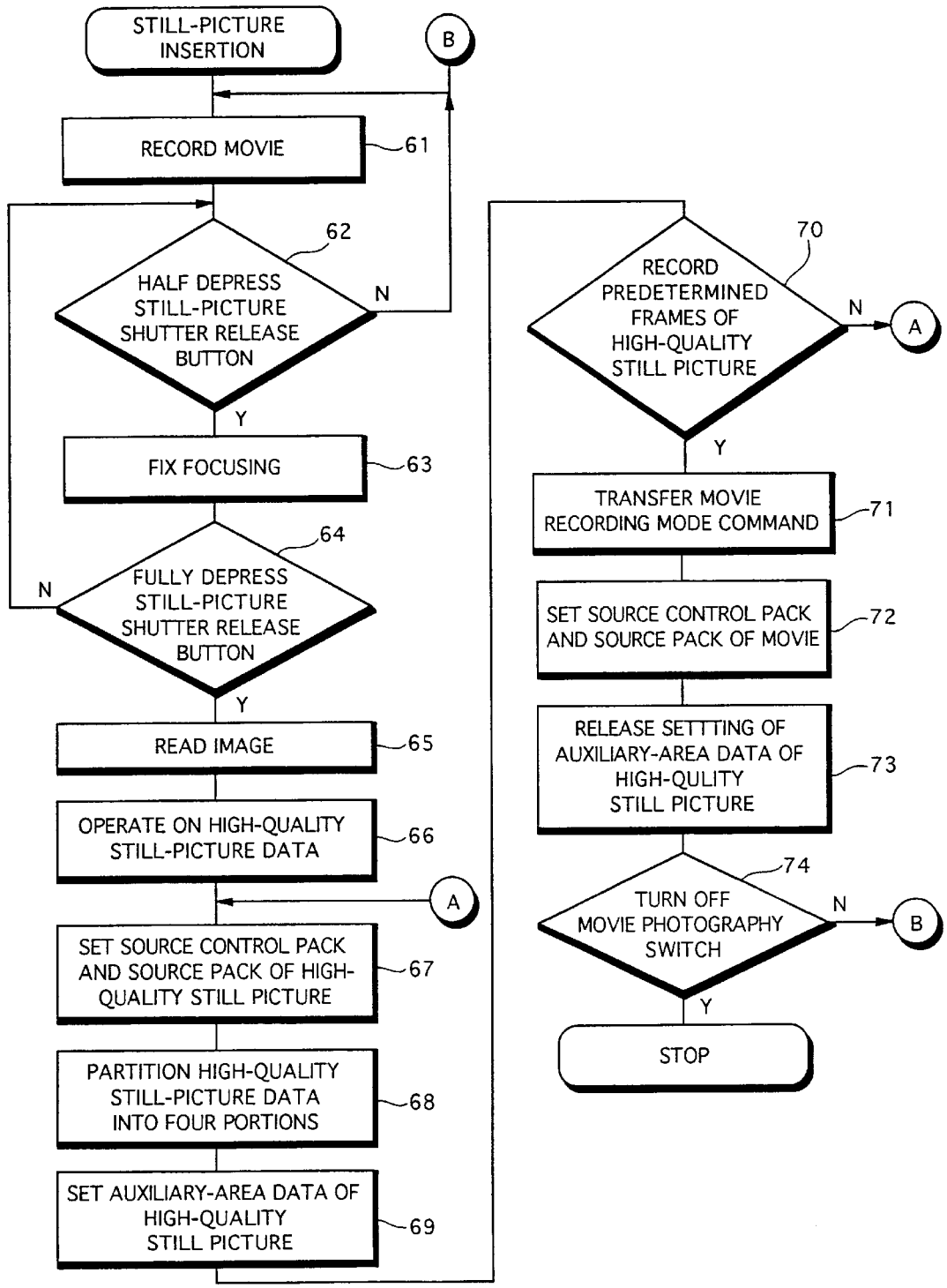
FIG. 10 illustrates a processing procedure for a case where high-quality still-picture photography is performed during recording of image data in movie photography.
Figure 11:
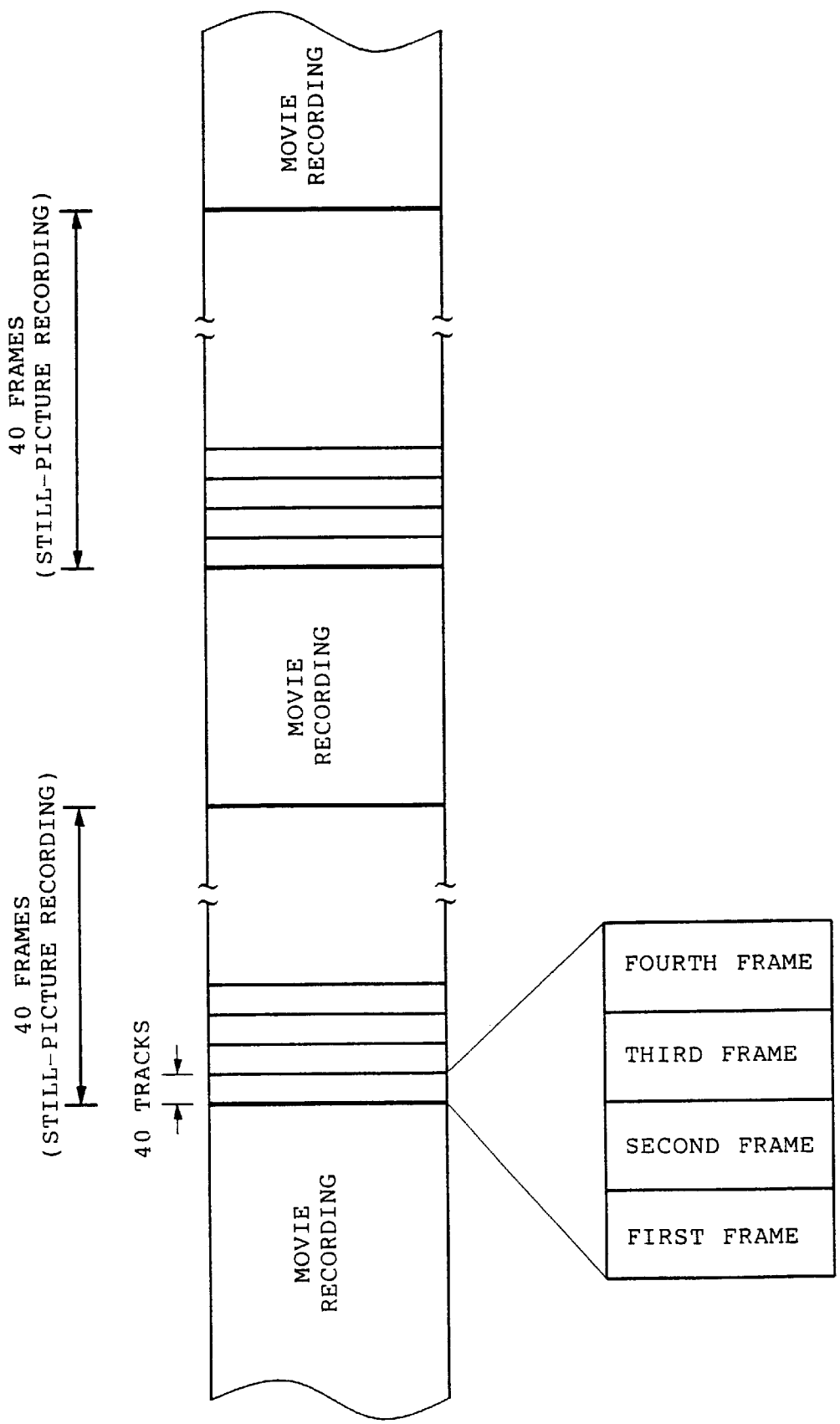
FIG. 11 illustrates the content of a magnetic tape for a case where high-quality still-picture photography is performed during recording of image data in movie photography.

FIG. 10 is a flowchart illustrating a processing procedure executed when recording of a high-quality still picture is performed during recording of a movie, and FIG. 11 illustrates the content of the magnetic tape 8 at this time.

The movie standby button 40 is turned on (pressed) to establish the movie standby state. If the movie photography button 41 is pressed in this state, photography of the subject begins (step 61). As a result, the first field and second field of field image data are alternately applied to the data rearrangement circuit 23 and recorded on the magnetic tape 8 in the manner set forth above.

If the still-photography shutter-release button 43 is pressed half way during moving recording (YES at step 62), focusing is fixed at this timing (step 63). If the still-photography shutter-release button 43 is pressed fully (YES at step 64), image data representing the image of the subject is stored in the frame memory 22 in the manner described above. When high-quality still-picture recording is carried out, the high-quality still-picture recording mode is set by the still-picture select switch 44. As a result, high-quality image data of about 1,400,000 pixels is generated in the DSP 17 and this data is stored in the frame memory 22 (steps 65, 66).

Next, the source control pack and the source pack are set (step 67). High-quality still-picture data composed of about 1,400,000 pixels stored in the frame memory 22 is read out. As shown in FIG. 8, each item of the high-quality still-picture data possesses about 350,000 pixels of image data and is partitioned into four frames in such a manner that one frame of an image is represented. The image data partitioned into four frames is applied to the data rearrangement circuit 23 one frame at a time (step 68). Further, auxiliary-area data (maker optin data) is set, with the exception of the source control pack and source pack already set (step 69). The set auxiliary-area data is applied to the error correction-code add-on circuit 26, where the data is added onto each item of image data partitioned into four frames.

In the high-quality still-picture recording mode, 40 frames of the same still picture are recorded. This is to facilitate the retrieval of still pictures during movie playback. In the high-quality still-picture recording mode, forty tracks of four frames are used to record one frame of about 1,400,000 pixels of image data on the magnetic tape 8. Accordingly, 1600 tracks of 160 frames are used to record forty frames of the same still picture. Recording of image data is repeated until the recording of forty frames ends.

When the recording of 40 frames ends (YES at step 70), a command for the movie recording mode is applied to the image sensing controller 20 in order to restore the movie recording (step 71). The source control pack and source pack regarding the image data obtained in the movie recording mode are set (step 72) and the setting of the auxiliary-area data regarding the high-quality still-picture data ends (step 73). The setting of the auxiliary-area data regarding the image data obtained by the movie recording mode naturally continues during movie recording, and the auxiliary-area data that has been set is added onto the image data.

The processing illustrated in FIG. 10 continues until the movie photography switch 41 is opened (turned off) (step 74).

As a result of the processing shown in FIG. 10, high-quality still-picture data is recorded during movie recording, as illustrated in FIG. 11.

Figure 12:
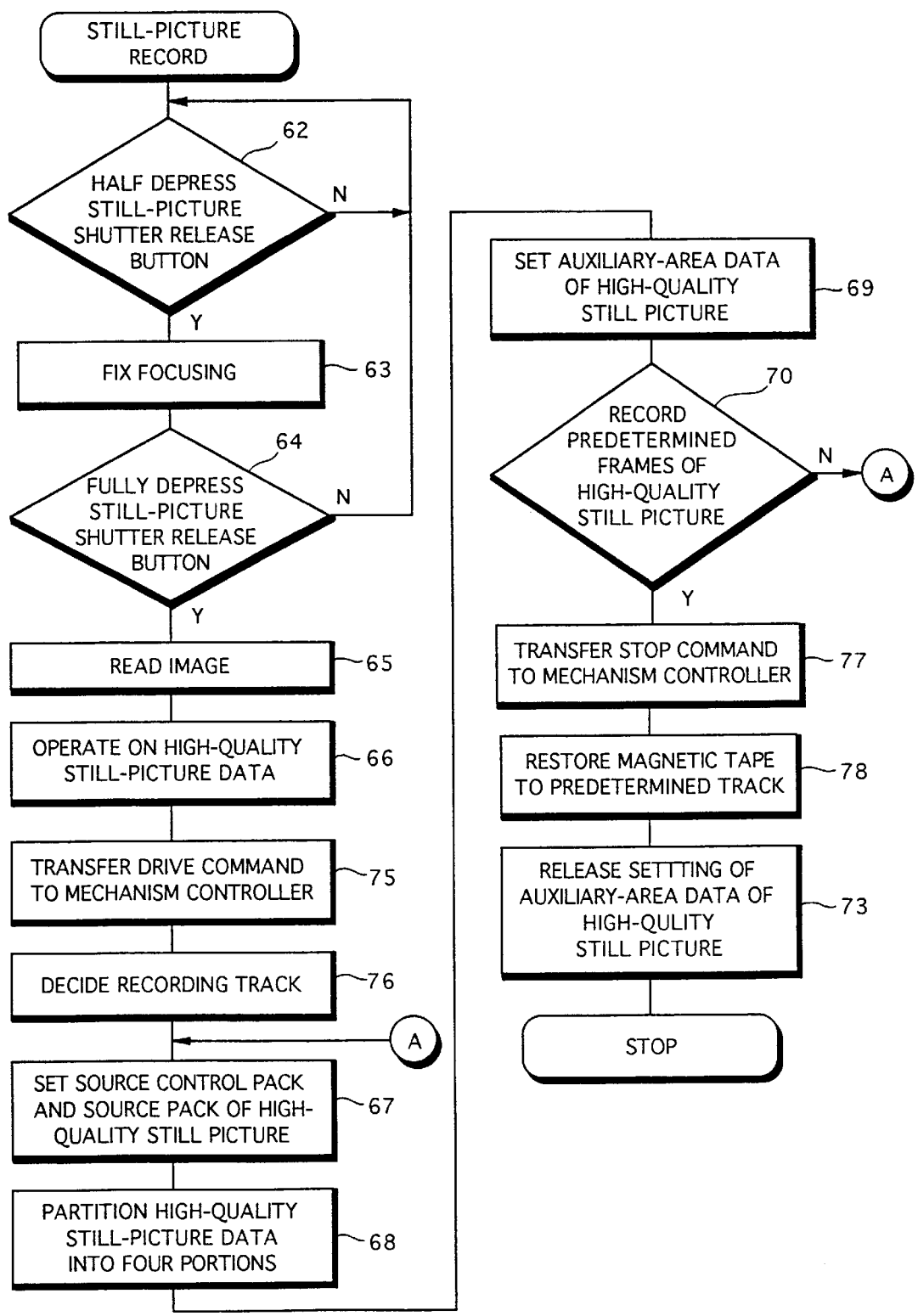
FIG. 12 illustrates the processing procedure of a still-picture recording mode.
Figure 13:
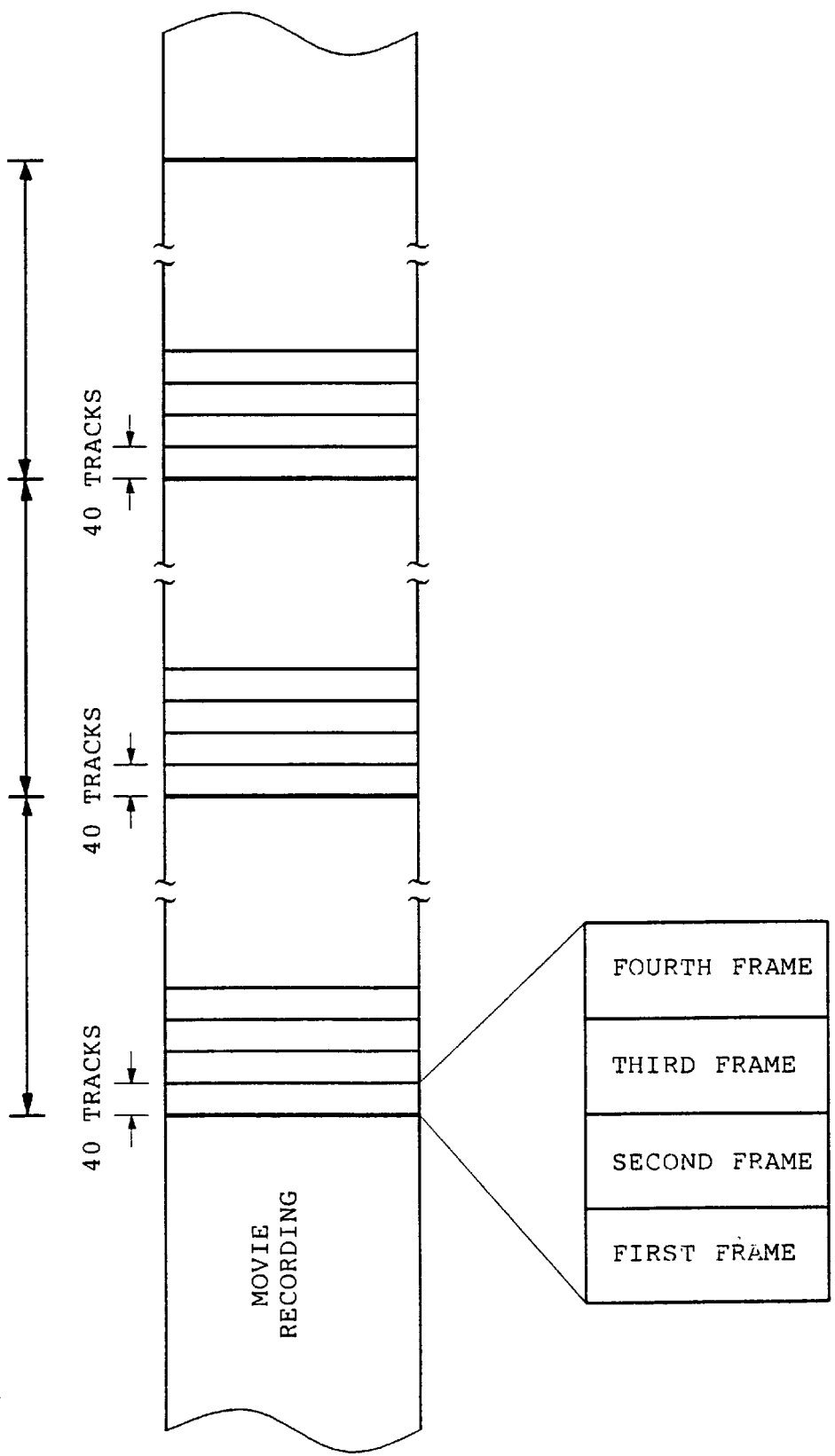
FIG. 13 illustrates the content of a magnetic tape on which image data has been recorded by the high-quality still-picture recording mode.

FIG. 12 is a flowchart illustrating the processing procedure executed when the digital video camera is used as a still video camera. Steps in FIG. 12 that are identical with those shown in FIG. 10 are designated by like step numbers and need not be described again. FIG. 13 shows the manner of recording on the magnetic tape 8 when the digital video camera is used as a still video camera.

By fully pressing the still-picture shutter-release button 43, image data possessing an amount of data conforming to the mode (high-quality still-picture recording mode or ordinary still-picture recording mode) designated by the still-picture select switch 44 is stored in the frame memory 22. It is assumed here that the high-quality still-picture recording mode has been set by the still-picture select switch 44.

In the case where the camera is used as a still video camera, the magnetic tape 8 is stopped, and so is the motor that drives the magnetic tape 8, prior to photography. It takes some time for the drive motor to rotate normally once it has been started. When the still-picture shutter-release button 43 has been fully pressed, therefore, a drive command is applied to a drive-mechanism controller 38 to start the rotation of the drive motor before image data is recorded on the magnetic tape 8 (step 75). Further, the magnetic tape 8 is played back and the absolute track number that has been recorded in the sub-code recording area of the magnetic tape 8 is read. On the basis of the absolute track number read, the track on which image data has been stored last is retrieved (step 76).

When image data making up forty frames of still pictures has been recorded on the magnetic tape 8 (YES at step 70), a stop command is applied to the drive-mechanism controller 38 to halt the drive motor of the magnetic tape 8 (step 77). In order to prevent the creation of a blank track owing to feeding of the magnetic tape 8 before the drive motor has a chance to start rotating normally in a case where recording of the next still picture is performed, the magnetic tape 8 is rewound slightly so as to position the magnetic head 18 at the next blank track when the drive motor has begun rotating normally.

By virtue of the processing shown in FIG. 12, still-picture data is recorded in the manner illustrated in FIG. 13.

Figure 14:
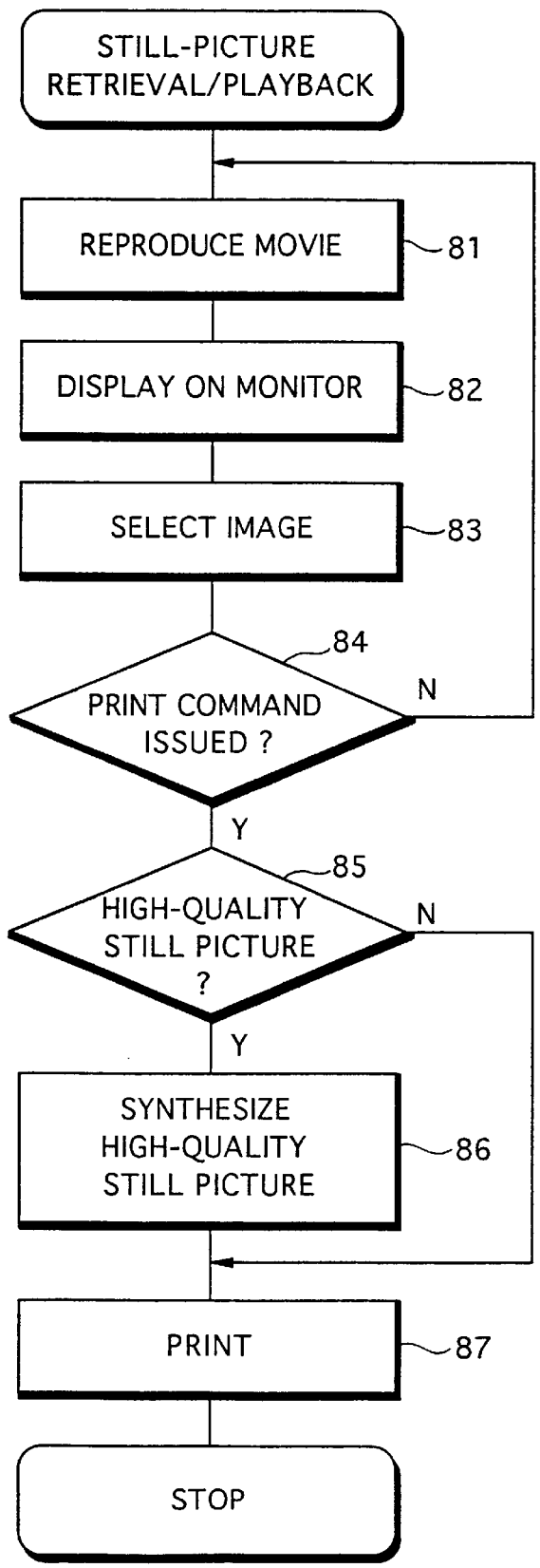
FIG. 14 illustrates a processing procedure for performing movie reproduction, retrieving an image to be printed and printing the image.

FIG. 14 is a flowchart illustrating the processing procedure executed when movie playback is performed and an image to be printed is retrieved and printed out.

First, the desired magnetic tape 8 is placed in the digital video tape recorder. The movie playback switch 45A is closed so that the image that has been recorded on the magnetic tape 8 is read by the magnetic head 31. The read image data is subjected to playback processing such as demodulation in the demodulator circuit 32 (step 81) and the processed data is applied to the monitor display unit 52. As a result, a movie image is displayed on the display screen of the monitor display unit 52 (step 82).

While observing the movie image displayed on the monitor display unit 52, the user looks for an image to be printed (step 83). If necessary, the fast-forward button 47 or rewind button 48 is pressed so that fast-forward movie playback or rewind movie playback is performed. When the image to be printed is found by the user, the temporary-stop button 49 is pressed. As a result, the desired image is displayed in a state in which it is frozen on the display screen of the monitor display unit 52. The photography mode, which represents whether the image has been recorded on the magnetic tape 8 by the high-quality still-picture photography mode, by the ordinary still-picture photography mode or by the movie photography mode, also is displayed on part of the frozen image. By observing the photography mode, the user can check the quality of the image being displayed on the monitor display unit 52.

In a case where the image quality of the image being displayed on the monitor display unit 52 is satisfactory, the user causes a print command to be sent from the printer 51 to the digital video tape recorder (YES at step 84). If the image quality of the image being displayed on the monitor display unit 52 is unsatisfactory, the user presses the fast-forward button 47 or the rewind button 48 and looks for an image having the desired quality. The print command applied to the digital video tape recorder from the printer 51 enters the system controller 10 via the interface 37.

Figure 15:
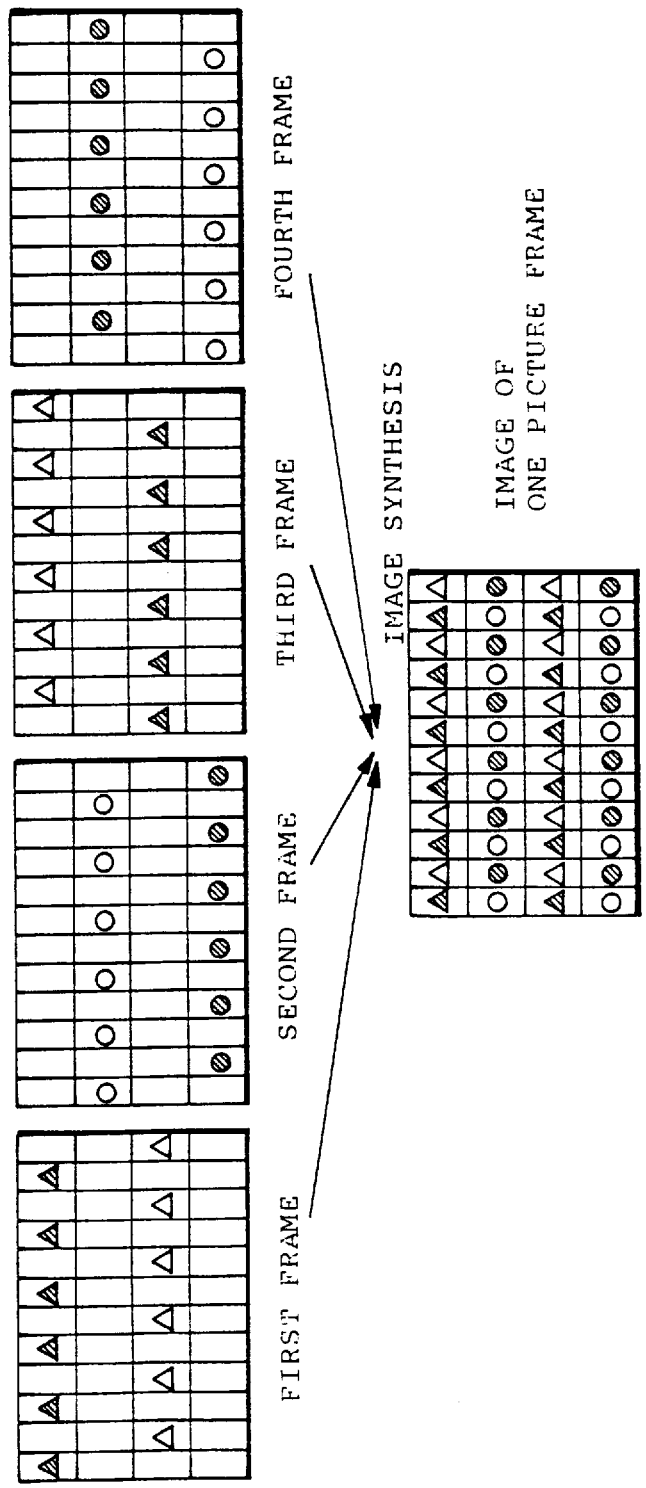
FIG. 15 illustrates processing for generating high-quality image data.

The still-picture identification code that has been recorded in the sub-code area is read and it is determined whether the code is indicative of high-quality still-picture recording (step 85). If the image being displayed on the monitor display unit 52 has been recorded on the magnetic tape 8 by the high-quality still-picture photography mode (YES at step 85), this means that one frame of a high-quality image has been recorded upon being partitioned into four frames. Accordingly, the still-picture playback button 45B is pressed so that image synthesizing processing is executed in the DSP circuit 36 (this is the still-picture playback mode) (step 86). This image synthesizing processing is performed by generating one frame of high-quality image data from four frames of image data, as shown in FIG. 15. If the image being displayed on the monitor display unit 52 has been recorded on the magnetic tape 8 by the ordinary still-picture photography or movie photography mode (NO at step 85), image synthesizing processing is not carried out. The generated high-quality image data, the frame image data obtained by the ordinary still-picture photography mode or the field image data obtained by the movie photography mode is applied to the printer 51, where the data is printed out (step 87). Movie playback is terminated by opening the movie playback switch 45.

Figure 16:
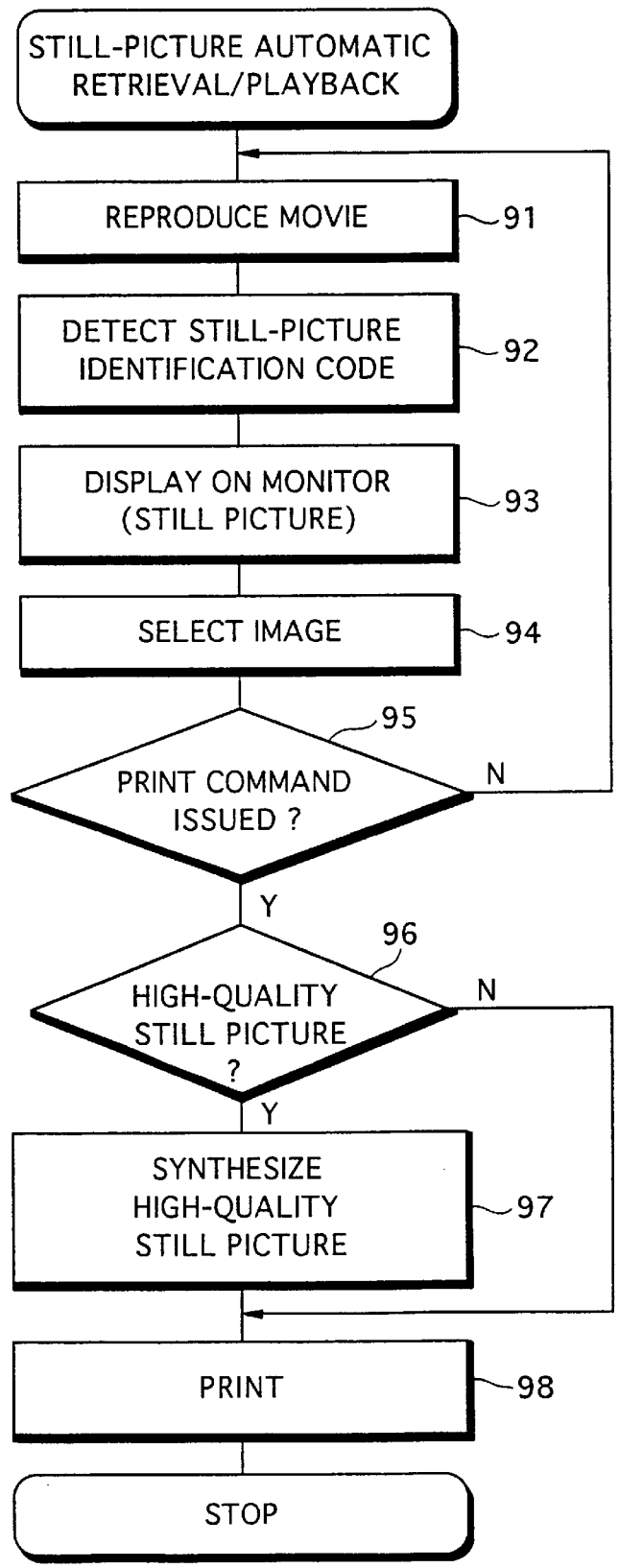
FIG. 16 illustrates the processing procedure of a still-picture automatic retrieval and playback mode.

FIG. 16 is a flowchart illustrating the processing procedure executed in the still-picture automatic retrieval playback mode.

According to the still-picture automatic retrieval playback mode, image data that has been recorded on the magnetic tape 8 by high-quality or ordinary still-picture photography is detected, only the image represented by this image data is displayed for a fixed period of time and fast-forward is performed with regard to image data that has been recorded on the magnetic tape 8 by movie photography.

When the desired magnetic tape 8 is placed in the digital video tape recorder and the still-picture automatic playback switch 46 is pressed, movie playback is performed (step 91). In movie playback, a track on which a still-picture identification code has been recorded in the sub-code area is retrieved (step 92). Image data on tracks for which still-picture identification codes have been recorded in the sub-code area are successively applied to the monitor display unit 52 at fixed intervals and the images resulting from still-picture photography are displayed (step 93).

While observing the images successively displayed on the display screen of the monitor display unit 52, the user looks for an image to be printed (step 94). When an image to be printed is found, the temporary-stop button 49 is pressed. In a case where an image being displayed on the monitor display unit 52 has been obtained by the high-quality print-image photography mode, the still-picture playback button 45B is pressed so that processing for generating image data is executed in the DSP circuit 36 in the manner shown in FIG. 15 (this is the still-picture playback mode) (steps 96, 97).

The generated high-quality image data or the frame image data obtained by the ordinary still-picture photography mode is applied to the printer 51, where the image data is printed out (step 98).

It is stated above that processing for synthesizing a high-quality still-picture in the DSP circuit 36 is performed by pressing the still-picture playback button 45B. However, processing for synthesizing a high-quality still-picture may be performed in response to a high-quality still-picture print command from the printer without providing the still-picture playback button 45B.

Figure 18:
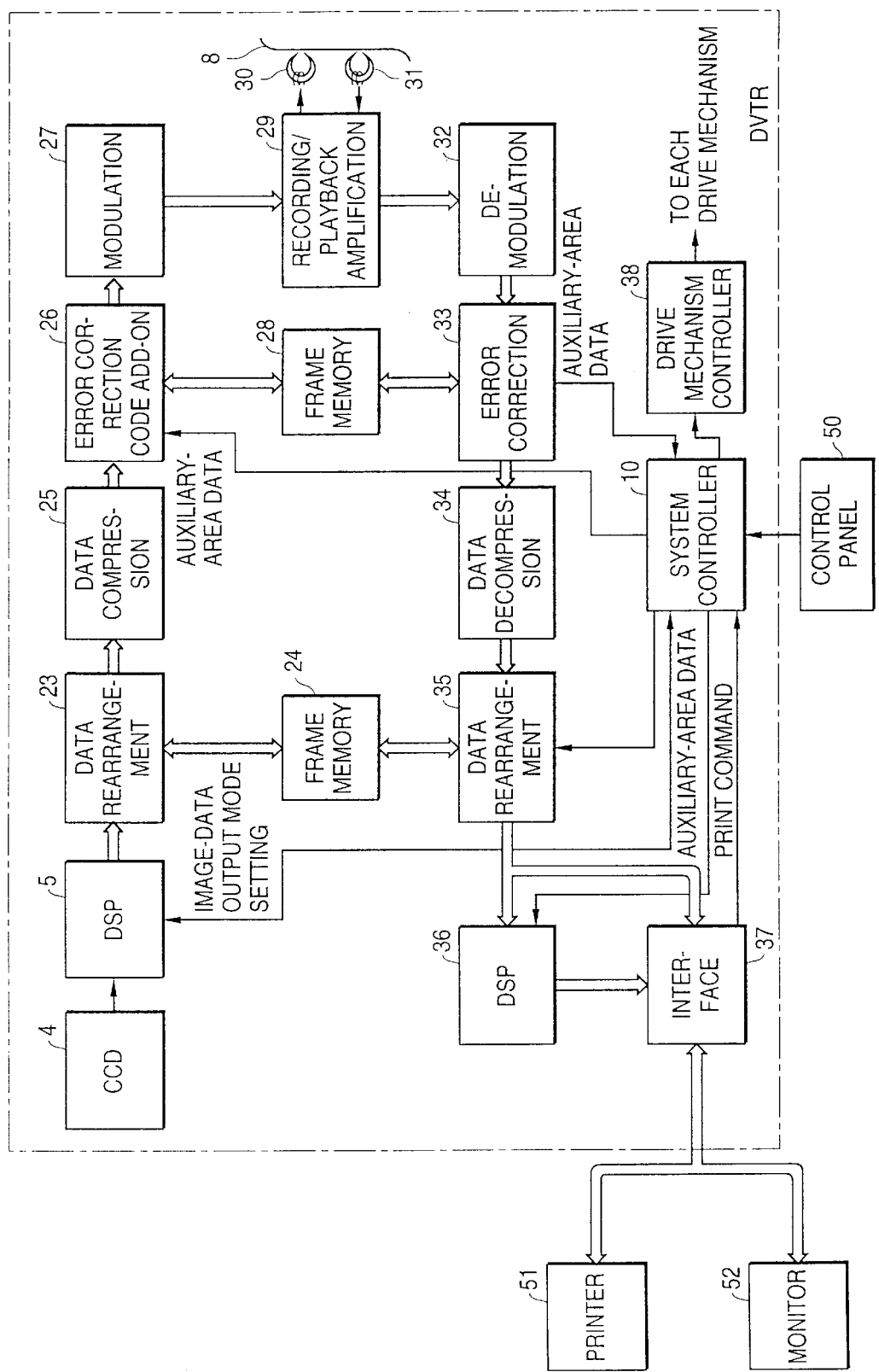
FIG. 18 is a block diagram illustrating the electrical configuration of a digital video tape recorder according to another embodiment of the present invention.

FIG. 18 is a block diagram illustrating the electrical configuration of a digital video tape recorder according to another embodiment of the present invention. components in FIG. 18 identical with those shown in FIG. 1 are designated by like reference characters and need not be described again.

In the digital video tape recorder illustrated in FIG. 1, three CCDs (R-CCD 14R, G-CCD 14G and B-CCD 14B) are used as image sensing elements. However, a single CCD 4 is used as the image sensing element in the digital video tape recorded shown in FIG. 18. The CCD 4 possesses about 700,000 pixels in an array of 1440 pixels horizontally and 480 pixels vertically, and the amount of image data obtained is twice that of a 350,000-pixel CCD. The amount of data in one frame of image data obtained from the 700,000-pixel CCD 4 corresponds to the amount of data in two frames of image data from a 350,000-pixel CCD.

In the digital video tape recorder of this embodiment, one frame of image data obtained from the CCD 4 is divided into two frames of image data, and each frame of image data is recorded on the magnetic tape 8 using ten tracks for each frame. As a result, it is possible to record image data that conforms to the existing recording standard of digital video tape recorders while achieving high-quality photography.

In the high-quality still-picture photography mode, a subject is photographed continuously at a fixed period of $\frac{1}{15}$ of a second by the CCD 4 having about 700,000 pixels. The shutter speed for photography is determined by so-called electronic shutter control so as to attain an appropriate value (e.g., $\frac{1}{60}$ of a second or a shorter speed if required). A video signal representing the image of the subject is outputted from the CCD 4 every $\frac{1}{15}$ of a second, and the video signal is applied to a DSP (digital signal processor) circuit 5. The latter executes analog/digital conversion processing for converting the video signal from the CCD 4 to digital image data, as well as processing for dividing one frame of image data into two frames of image data. The method of dividing up the data is as set forth below.

Figure 19A:
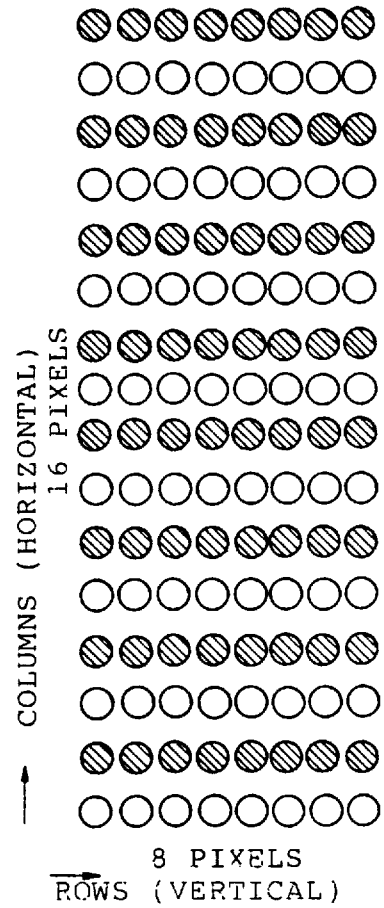
FIGS. 19a, 19b and 19c schematically illustrate pixels represented by image data.

FIGS. 19*a*, *b* and *c* schematically illustrate the pixel array of the CCD 4 and the manner in which the image data of these pixels is partitioned into two frames. In order to simplify the drawings, the numbers of pixels are drawn to be much fewer than in actuality in both the horizontal and vertical directions. The type of array (mosaic, stripe, delta, etc.) does not matter. As shown in FIG. 19*a*, one frame of image data outputted by the CCD 4 and converted from analog to digital data contains image data regarding all pixels in the horizontal and vertical directions (i.e., 720 pixels in the horizontal direction and 480 pixels in the vertical direction).

In the DSP circuit 5, the image data is read out twice, one frame each time.

Figure 19C:
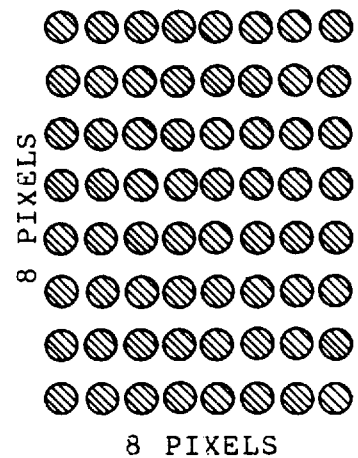
Figure 19B:
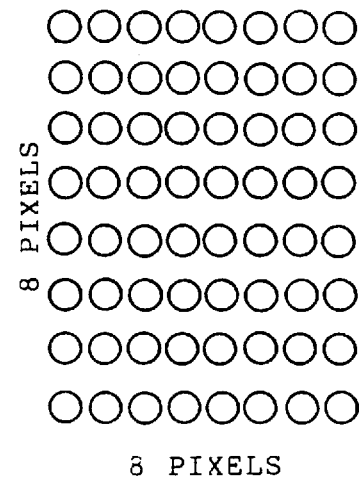

The first frame of image data read out the first time is image data composed of pixels in odd columns. This image data composed of the odd columns is expressed by the white circles. The pixels represented by the image data that have been read out are illustrated in FIG. 19*b*. The second frame of image data read out the second time is image data composed of pixels in even columns. This image data composed of the even columns is expressed by the black circles. The pixels represented by the image data that have been read out are illustrated in FIG. 19*c*.

The image data composed of all pixels is read out only one time in either frame. Moreover, the pixels of the image data constructing each field are dispersed in the horizontal direction and the image of the subject can be expressed in its entirety by the image data of either frame.

The image data divided up into two frames in the DSP 5 undergoes rearrangement processing in the data rearrangement circuit 23 and the rearranged data is recorded on the magnetic tape 8.

One frame of image data obtained using the 700,000-pixel CCD 4, namely the initial single frame of image data in the two frames of image data, corresponds to the amount of data in one frame of image data obtained by photographing a subject using the 350,000-pixel CCD employed normally. Accordingly, the data is recorded in the video recording area $A_2$ on ten consecutive tracks thereof. The remaining one frame of image data in the two frames of image data is recorded in the video recording area $A_2$ on ten tracks that follow the image data of the initial frame of image data already recorded. Since one frame of image data obtaining using the 700,000-pixel CCD 4 has an amount of image data that is twice that of the one frame of image data obtained using the 350,000-pixel CCD employed normally, this data is recorded on the magnetic tape 8 using 20 tracks. The operation for recording the two frames is performed at a period of $\frac{1}{15}$ of a second in the same manner that two frames of photography is carried out.

The digital video tape recorder shown in FIG. 18 also is capable of performing photography in the ordinary still-picture photography mode in addition to the high-quality still-picture photography mode. In the ordinary still-picture photography mode, image data composed of about 350,000 pixels shown in FIG. 19*b* or FIG. 19*c* is obtained from the image data of about 700,000 pixels, as illustrated in FIG. 19*c*, and the image data of either FIG. 19*b* or FIG. 19*c* is recorded over ten tracks of the magnetic tape 8.

The digital video tape recorder shown in FIG. 18 is also capable of reproducing digital image data, which has been recorded on the magnetic tape 8, in the same manner as in the digital video tape recorder depicted in FIG. 1. Reproduction of image data in this digital video tape recorder includes both movie playback and still-picture playback. In still-picture playback, the image data that has been recorded on the magnetic tape 8 in the high-quality still-picture photography mode undergoes processing for generation of image data from FIGS. 19*b* and 19*c*, as shown in FIG. 19*a*. When an image desired to be printed has been found, the image is printed out in accordance with a print command applied from the printer 51 to the digital video tape recorder.

In the digital video tape recorder illustrated in FIG. 18, use is made of the CCD 4 having twice as many pixels (namely about 700,000) as the approximately 350,000 pixels employed conventionally. However, it goes without saying that it is possible to use a CCD possessing a number of pixels which is n (n=3, 4, . . . ) times the number of pixels used conventionally. In such case image partitioning processing would be executed in conformity with the number of pixels.

As many apparently widely different embodiments of the present invention can be made without departing from the spirit and scope thereof, it is to be understood that the invention is not limited to the specific embodiments thereof except as defined in the appended claims.

What is claimed is:

1. A digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively at a period equivalent to the recording time, said apparatus comprising:

input means for entering image data possessing an amount of data that is n times the amount of data in the unit image data;

image data partitioning means for partitioning the image data, which has been obtained from said input means, into n units of unit image data of a single channel in such a manner that each represents one frame of an image;

image-data information generating means for generating information relating to the partitioning of the image data partitioned by said image data partitioning means;

recording means for recording the n units of unit image data, which have been partitioned by said image data partitioning means, on the recording medium over n recording areas at a recording time increased by a factor of n; and image-data information recording means for recording, in an auxiliary recording area other than the recording area of the unit image data, the information relating to the partitioning of the image data generated by said image-data information generating means.

2. The apparatus according to claim 1, wherein said input means is image sensing means for sensing the image of a subject, thereby outputting image data representing the image of the subject and possessing an amount of data that is n times the amount of image data in the unit image data.

3. The apparatus according to claim 2, wherein said image sensing means includes a single electronic solid-state image sensing device for generating an amount of data that is n times the amount of image data in the unit image data with regard to one frame of an image, said image sensing means outputting image data representing the image of the subject obtained by sensing the image of the subject using said solid-state image electronic image sensing device.

4. The apparatus according to claim 2, wherein said image sensing means includes three electronic solidstate electronic image sensing elements, said image sensing means combining image data outputted by these three solid-state electronic image sensing devices, thereby generating and outputting image data possessing an amount of data that is n times the amount of image data in the unit image data.

5. The apparatus according to claim 1, wherein the information relating to the image data generated by said image-data information generating means is a method of partitioning the image data, recording-area data representing a unit image data recording area in which the partitioned image data is recorded, data representing a particular number of a portion into which the image data has been partitioned, or data representing a method of displaying or inserting image data on a display unit.

6. The apparatus according to claim 1, further comprising:
reading means for reading image data and information relating to the image data from the recording medium; and
still-picture generating means for generating image data, which represents one frame of a still picture, by combining n units of unit image data based upon the information relating to image data read by said reading means, said n units of unit image data having been read by said reading means and generated by partitioning from one frame of image data.

7. The apparatus according to claim 1, further comprising:
reading means for reading image data and information relating to the image data from the recording medium;
playback mode setting means for selectively setting a still-picture playback mode and a movie playback mode;
still-picture generating means which, when the still-picture playback mode has been set, is for generating image data, which represents one frame of a still picture, by combining n units of unit image data based upon the information relating to image data read by said reading means, said n units of unit image data having been read by the reading means and generated by partitioning from one frame of image data; and
moving-picture generating means which, when the movie playback mode has been set, is for converting unit image data, which has been read by said reading means, to a signal suitable for display, and outputting the signal successively at a period equivalent to the recording time.

8. A digital image data reproducing apparatus for reproducing one frame of an image from a recording medium, wherein the one frame of an image is represented by unit image data having a predetermined amount of image data, size of a recording area for the unit image data and recording time necessary for recording the unit image data are each stipulated in advance, and image data representing one frame of an image and possessing an amount of data that is n times the amount of data in the unit image data having been partitioned into n units of unit image data in accordance with the stipulation in such a manner that each represents one frame of an image, the n units of unit image data then having been recorded on the recording medium successively in a single channel at a period equivalent to the recording time, and information relating to partitioning of the image data partitioned into the n units of unit image data having been stored in an auxiliary recording area other than the recording area of the unit image data, said apparatus comprising:
reading means for reading image data from the recording area of the unit image data and information relating to the partitioning of the image data from the auxiliary recording area; and
still-picture generating means for generating image data, which represents one frame of a still picture, by combining n units of unit image data based upon the information relating to the partitioning of the image data read by said reading means, said n units of unit image data having been read by said reading means and generated by partitioning from one frame of image data.

9. A digital image data reproducing apparatus for reproducing one frame of an image from a recording medium, wherein the one frame of an image is represented by unit image data having a predetermined amount of image data, size of a recording area for the unit image data and recording time necessary for recording the unit image data are each stipulated in advance, and image data representing one frame of an image and possessing an amount of data that is n times the amount of data in the unit image data having been partitioned into n units of unit image data in such a manner that each represents one frame of an image, the n units of unit image data then having been recorded on the recording medium successively at a period equivalent to the recording time, and information relating to the partitioning of the image data partitioned into the n units of unit image data having been stored in an auxiliary recording area other than the recording area of the unit image data, said apparatus comprising:
reading means for reading image data from the recording area of the unit image data and information relating to the partitioning of the image data from the auxiliarv recording area;
playback mode setting means for selectively setting a still-picture playback mode and a movie playback mode;
still-picture generating means which, when the still-picture playback mode has been set, is for generating image data, which represents one frame of a still picture, by combining n units of unit image data based upon the information relating to partitioning of the image data read by said reading means, said n units of unit image data having been read by the reading means and generated by partitioning from one frame of image data; and
moving-picture generating means which, when the movie playback mode has been set, is for converting unit image data, which has been read by said reading means, to a signal suitable for display, and outputting the signal successively at a period equivalent to the recording time.

10. In a digital image data recording apparatus in which one frame of an image is represented by unit image data having a predetermined amount of image data, and size of a recording area for the unit image data and recording time necessary for recording the unit image data are each predetermined, the recording apparatus recording the unit image data on a recording medium successively in a single channel at a period equivalent to the recording time, a method of recording digital image data comprising the steps of:

obtaining image data possessing an amount of data that is n times the amount of data in the unit image data;

partitioning the obtained image data into n units of unit image data of the single channel in such a manner that each represents one frame of an image;

generating information relating to the partitioning of the n units of image data recording the n units of unit image data obtained by partitioning on the recording medium over n recording areas at a recording time increased by a factor of n; and recording the information relating to the partitioning of the n units of unit image data, obtained by the generating, on the recording medium in an auxiliary recording area other than the recording area of the unit image data.

11. The method according to claim 10, further comprising sensing the image of a subject, thereby obtaining image data representing the image of the subject and possessing an amount of data that is n times the amount of image data in the unit image data.

12. The method according to claim 11, wherein image data representing the image of a subject is obtained by sensing the image of the subject using a single electronic solid-state image sensing device for generating an amount of data that is n times the amount of image data in the unit image data with regard to one frame of an image.

13. The method according to claim 11, wherein the sensing of the image of a subject includes using three electronic solid-state electronic image sensing elements and further comprising combining the image data output by the three solidstate electronic image sensing elements, thereby generating an amount of data that is n times the amount of image data in the unit image data and obtaining image data representing the image of the subject.

14. The method according to claim 10, wherein the generated information relating to the image data is a method of partitioning the image data, recording-area data representing a unit image data recording area in which the partitioned image data is recorded, data representing a particular number of a portion into which the image data has been partitioned, or data representing a method of displaying or inserting image data on a display unit.

15. A digital image data reproducing method for reproducing one frame of an image from a recording medium, wherein the one frame of an image is represented by unit image data having a predetermined amount of image data, size of a recording area for the unit image data and recording time necessary for recording the unit image data are each stipulated in advance, and image data representing one frame of an image and possessing an amount of data that is n times the amount of data in the unit image data having been partitioned into n units of unit image data in accordance with the stipulation in such a manner that each represents one frame of an image, the n units of unit image data then having been recorded on the recording medium successively in a single channel at a period equivalent to the recording time, and information relating to partitioning of the image data partitioned into the n units of unit image data having been stored in an auxiliary recording area other than the recording area of the unit image data, said method comprising the steps of:

reading image data from the recording area of the unit image data and information relating to the partitioning of the image data from the auxiliary recording area; and generating image data, which represents one frame of a still picture, by combining n units of unit image data based upon the information relating to the partitioning of the image data read by said reading, said n units of unit image data having been read and generated by partitioning from one frame of image data.

16. A digital image data reproducing method for reproducing one frame of an image from a recording medium, wherein the one frame of an image is represented by unit image data having a predetermined amount of image data, size of a recording area for the unit image data and recording time necessary for recording the unit image data are each stipulated in advance, and image data representing one frame of an image and possessing an amount of data that is n times the amount of data in the unit image data having been partitioned into n units of unit image data in accordance with the stipulation in such a manner that each represents one frame of an image, the n units of unit image data then having been recorded on the recording medium successively in a single channel at a period equivalent to the recording time, and information relating to partitioning of the image data partitioned into the n units of unit image data has been stored in an auxiliary recording area other than the recording area of the unit image data, said method comprising the steps of:

reading image data from the recording area of the unit image data and information relating to the partitioning of the image data from the auxiliary recording area;

making it possible to selectively set a still-picture playback mode and a movie playback mode;

when the still-picture playback mode has been set, generating image data representing one frame of a still picture by combining n units of read unit image data, generated by partitioning from one frame of image data, based upon the information relating to the partitioning of the image data read by said reading; and when the movie playback mode has been set, converting the read unit image data to a signal suitable for display and outputting the signal successively at a period equivalent to the recording time.

\* \* \* \* \*